(12) United States Patent
Doel et al.

(10) Patent No.: US 11,636,416 B2
(45) Date of Patent: Apr. 25, 2023

(54) METHODS AND SYSTEMS FOR RISK DATA GENERATION AND MANAGEMENT

(71) Applicant: Tracker Networks Inc., Toronto (CA)

(72) Inventors: Jason Doel, Newmarket (CA); Roger Ramchand Mahabir, Toronto (CA); Mesbah Abdulrahem, Guelph (CA); Peter Grys, Richmond Hill (CA); Peter Ritchie, Toronto (CA); Gagandeep Singh Majathia, Brooklin (CA)

(73) Assignee: Tracker Networks Inc., Toronto (CA)

( * ) Notice: Subject to any disclaimer, the term of this patent is extended or adjusted under 35 U.S.C. 154(b) by 337 days.

(21) Appl. No.: 16/893,272

(22) Filed: Jun. 4, 2020

(65) Prior Publication Data

US 2020/0304536 A1     Sep. 24, 2020

Related U.S. Application Data

(63) Continuation-in-part of application No. 15/810,870, filed on Nov. 13, 2017, now abandoned.

(51) Int. Cl.
 *H04L 9/40* (2022.01)
 *G06Q 10/0635* (2023.01)

(52) U.S. Cl.
 CPC ....... *G06Q 10/0635* (2013.01); *H04L 63/102* (2013.01); *H04L 63/1433* (2013.01); *H04L 63/1475* (2013.01); *H04L 63/20* (2013.01)

(58) Field of Classification Search
 CPC ............................ H04L 63/1433; H04L 63/20
 USPC .......................................................... 726/25
 See application file for complete search history.

(56) References Cited

U.S. PATENT DOCUMENTS

| | | |
|---|---|---|
| 7,096,502 B1 | 8/2006 | Fox et al. |
| 8,578,443 B2 | 11/2013 | Narain et al. |
| 8,713,684 B2 | 4/2014 | Bettini et al. |
| 8,752,176 B2 | 6/2014 | Mahaffey et al. |
| 8,918,881 B2 | 12/2014 | Bettini et al. |
| 8,949,993 B2 | 2/2015 | Basavapatna et al. |
| 8,984,628 B2 | 3/2015 | Mahaffey et al. |
| 9,152,694 B1 | 10/2015 | Padidar et al. |
| 9,185,099 B2 | 11/2015 | Brannon |
| 9,215,074 B2 | 12/2015 | Wyatt et al. |
| 9,294,500 B2 | 3/2016 | Mahaffey |
| 9,298,936 B2 | 3/2016 | Stuntebeck |

(Continued)

*Primary Examiner* — Anthony D Brown
(74) *Attorney, Agent, or Firm* — Bereskin & Parr LLP/S.E.N.C.R.L., s.r.l.

(57) ABSTRACT

Risk data generation for an organizational network involves a risk assessment server that communicates with organizational computing devices. The server transmits risk data request and receives responses identifying organizational risks. The server generates and transmits assessment templates, and receives risk evaluation data from a plurality of computing devices in response. The server automatically generates a risk assessment score for an organizational risk based on the values in the plurality of risk evaluation responses, the risk assessment score defining an expected organizational impact of that particular organizational risk and transmits the risk assessment score to an administrator. The server collects benchmark risk data and risk outcomes from similar networks and generates the scores using the benchmark data. The server also provides comparative results between similar organizational networks.

20 Claims, 13 Drawing Sheets

(56) References Cited

U.S. PATENT DOCUMENTS

| | | |
|---|---|---|
| 9,307,412 B2 | 4/2016 | Halliday et al. |
| 9,344,431 B2 | 5/2016 | Mahaffey et al. |
| 9,912,686 B2 | 3/2018 | Mahabir et al. |
| 10,142,364 B2 | 11/2018 | Baukes et al. |
| 10,440,045 B2 | 10/2019 | Baukes et al. |
| 2002/0198750 A1 | 12/2002 | Innes et al. |
| 2004/0006704 A1 | 1/2004 | Dahlstrom et al. |
| 2009/0077096 A1* | 3/2009 | Ohama ............... G06F 21/575 |
| 2010/0114634 A1 | 5/2010 | Christiansen et al. |
| 2011/0119106 A1 | 5/2011 | Dahl et al. |
| 2012/0004946 A1 | 1/2012 | Blackwood et al. |
| 2012/0290640 A1 | 11/2012 | Mahaffey et al. |
| 2013/0263260 A1 | 10/2013 | Mahaffey et al. |
| 2013/0333039 A1 | 12/2013 | Kelly |
| 2013/0347094 A1 | 12/2013 | Bettini et al. |
| 2014/0189873 A1 | 7/2014 | Elder et al. |
| 2014/0196150 A1 | 7/2014 | Bettini et al. |
| 2014/0324517 A1* | 10/2014 | Harris ............... G06Q 10/0633 |
| | | 705/7.27 |
| 2014/0331281 A1 | 11/2014 | Bettini et al. |
| 2015/0066578 A1 | 3/2015 | Manocchia et al. |
| 2015/0142700 A1 | 5/2015 | Best et al. |
| 2015/0150137 A1 | 5/2015 | Bettini et al. |
| 2015/0169877 A1 | 6/2015 | Mahaffey et al. |
| 2015/0172057 A1 | 6/2015 | Mahaffey et al. |
| 2015/0172060 A1 | 6/2015 | Mahaffey et al. |
| 2015/0188924 A1 | 7/2015 | Mahaffey et al. |
| 2015/0237065 A1 | 8/2015 | Roytman et al. |
| 2015/0244743 A1 | 8/2015 | Jagad et al. |
| 2015/0278488 A1 | 10/2015 | Batchu et al. |
| 2015/0302182 A1 | 10/2015 | Wyatt et al. |
| 2016/0012220 A1 | 1/2016 | Padidar et al. |
| 2016/0050226 A1 | 2/2016 | Bettini et al. |
| 2016/0087987 A1 | 3/2016 | Stuntebeck et al. |
| 2016/0092685 A1 | 3/2016 | Tse et al. |
| 2016/0094560 A1 | 3/2016 | Stuntebeck |
| 2016/0099963 A1 | 4/2016 | Mahaffey et al. |
| 2016/0125184 A1 | 5/2016 | Mahaffey et al. |
| 2017/0061345 A1 | 3/2017 | Jones, III et al. |
| 2017/0091078 A1 | 3/2017 | Atyam et al. |
| 2017/0206350 A1 | 7/2017 | Salajegheh et al. |
| 2017/0228558 A1* | 8/2017 | Le Rudulier ........... G06Q 10/10 |
| 2017/0346824 A1 | 11/2017 | Mahabir et al. |
| 2017/0366570 A1 | 12/2017 | Wisdom et al. |
| 2018/0089449 A1* | 3/2018 | Boudreau ........... H04L 63/0227 |
| 2019/0147376 A1 | 5/2019 | Mahabir et al. |

* cited by examiner bestbank

Risk Action Update Request

Risk Name        Exchange Rate Decreases More Than 10%
Action Item      Consider purchasing currency spot agreements
Due Date         11 / 20 / 2017
Descriptions
Current Status   In Process
Update Status    Completed
Add Note Submit

METHODS AND SYSTEMS FOR RISK DATA GENERATION AND MANAGEMENT

CROSS-REFERENCE TO RELATED APPLICATION

This application is a continuation-in-part of U.S. patent application Ser. No. 15/810,870, filed Nov. 13, 2017, the entirety of which is incorporated herein by reference.

FIELD

The described embodiments relate to managing risk data, and in particular to systems and methods for generating and managing risk data in a distributed organizational network.

INTRODUCTION

The following is not an admission that anything discussed below is part of the prior art or part of the common general knowledge of a person skilled in the art.

It is difficult to identify and monitor risks that can impact an organization, particularly as the organization grows and becomes distributed. It may be unfeasible or unwieldy for organizations to manually assess and analyze the risks posed to various aspects of their operations, such as cybersecurity risks and/or risks posed by internal and external operational influences. Ongoing monitoring of potential risks and risk factors can become particularly unfeasible as organizations grow and the risk factors become associated with different areas and users in an organizational network.

Organizations may also not have the internal expertise and personnel required to perform this assessment. For instance, an organization may be required to track and assess hundreds of risks such that manually tracking and assessing risks is not feasible. Similarly, manually tracking and assessing underlying risk data for risks that are associated with different areas or locations within the organizational network can become unfeasible. Maintaining an up-to-date assessment of the risk data similarly becomes an unfeasible task given the breadth and scope of risk data that needs to be collected, processed and analyzed.

As a result, organizational risk assessments tend to use outdated and incomplete risk data. This can result in an inaccurate assessment of the organizational risk profile. Additionally, as organizations may lack the internal expertise and personnel to perform these assessments, the analysis of the underlying risk data may itself be flawed. Further, for risks common across multiple organizational networks, individual organizations may be unable to adequately assess and mitigate these shared risks.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In a broad aspect, there is provided a system for analyzing risk data for a plurality of organizational networks, the system including: at least one risk assessment processor in communication with the plurality of organizational networks, where the at least one risk assessment processor is configured to monitor organizational risk associated with each organizational network; at least one non-volatile storage memory configured to store risk data associated with a plurality of organizational risks, network data associated with each organizational network in the plurality of organizational networks, and organizational group data defining a plurality of organizational groups, where each organizational group is associated with at least one of the organizational networks in the plurality of organizational networks; the at least one risk assessment processor can be configured to provide a risk assessment platform that is remotely accessible by a plurality of administrator devices, the plurality of administrator devices including at least one administrator device associated with each of the organizational networks; the risk assessment platform can define an organizational group interface accessible by each of the administrator devices, where the organizational group interface: can enable each administrator device to associate one or more organizational groups with the organizational network associated with that administrator device; and for a particular organizational group, provide each administrator device associated with each organizational network associated with that particular organizational group with access to shared risk data from a plurality of sharing organizational networks associated with the particular organizational group, where the shared risk data includes internal risk data from each of the organizational networks in the plurality of sharing organizational networks, and the plurality of sharing organizational networks includes a plurality of unrelated organizational networks.

In some embodiments, the at least one risk assessment processor can be configured to: define the plurality of organizational groups to include a plurality of sector-specific groups, where each sector-specific group corresponds to a specific organizational sector; define sector-specific risk assessment templates for each of the specific organizational sectors; define the organizational group interface to: enable each administrator device to associate one or more sector-specific organizational groups with the organizational network associated with that administrator device, where the one or more sector-specific organizational groups correspond to the specific organizational sector of the organizational network associated with that administrator device; and for each sector-specific organizational group, provide each administrator device associated with each organizational network associated with that sector-specific organizational group with the sector-specific risk templates associated with the specific organizational sector that corresponds to that sector-specific organizational group.

In some embodiments, the organizational group interface can define, for each sector-specific organizational group, a data steam of sector-specific risk data for the specific organizational sector that corresponds to that sector-specific organizational group, where the data stream of sector-specific risk data comprises a real-time or near-real-time stream of risk data related to risks common to organizational networks within that specific organizational sector.

In some embodiments, for each sector-specific organizational group, the organizational group interface can provide a risk sharing interface that enables each administrator device associated with that sector-specific organizational group to link internal sector-specific risk data to the data stream of sector-specific risk data so that the data stream of sector-specific risk data includes the linked internal sector-specific risk data.

In some embodiments, the at least one risk assessment processor can be configured to remove confidential data from the internal sector-specific risk data linked to the data stream of sector-specific risk data.

In some embodiments, the at least one risk assessment processor can be configured to: identify the confidential data from the internal sector-specific risk data linked to the data stream of sector-specific risk data; and automatically remove the identified confidential data prior to the internal sector-specific risk data being included in the data stream of sector-specific risk data.

In some embodiments, the at least one risk assessment processor can be configured to: identify potential confidential data from the internal sector-specific risk data linked to the data stream of sector-specific risk data; generate a data removal prompt for the administrator device prior to including the internal sector-specific risk data in the data stream of sector-specific risk data; receive a removal input from the administrator device in response to the data removal prompt, where the removal input identifies selected confidential data from the identified potential confidential data; and remove the selected confidential data prior to the internal sector-specific risk data being included in the data stream of sector-specific risk data.

In some embodiments, for each sector-specific group the at least one risk assessment processor can be configured to identify popular risk data for the specific organizational sector corresponding to that sector-specific group, where the popular risk data is identified based on risk data interactions from the organizational networks corresponding to the specific organizational sector; and the data steam of sector-specific risk data includes the identified popular risk data corresponding to the specific organizational sector.

In some embodiments, for a particular sector-specific group, the at least one risk assessment processor can be configured to: identify a collective mitigation action, where the collective mitigation action corresponds to an associated sector-specific risk for the specific organizational sector associated with that particular sector-specific group; generate a collective risk mitigation notification corresponding to the collective mitigation actions; and provide the collective risk mitigation notification to each administrator device associated with each organizational network associated with that particular sector-specific group, where the collective risk mitigation notification provides an indication of the associated sector-specific risk and the residual risk value associated with the collective mitigation action.

In some embodiments, the at least one risk assessment processor can be configured to: identify a plurality of mitigating organizational networks from the plurality of organizational networks associated with the particular sector-specific group, where the plurality of mitigating organizational networks are the organizational networks associated with the particular sector-specific group implementing the collective risk mitigation action; and notify the administrator devices associated with each organizational network associated with that particular sector-specific group of the plurality of mitigating organizational networks.

In some embodiments, the organizational group interface can enable each administrator device to share internal risk data with the one or more organizational groups associated with the organizational network associated with that administrator device; and the at least one risk assessment processor can be configured to remove confidential data from the internal risk data shared by each of the administrator devices.

In some embodiments, the at least one risk assessment processor can be configured to, for each administrator device sharing internal risk data: identify potential confidential data from the internal risk data shared by that administrator device; generate a data removal prompt for that administrator device prior to including the internal risk data in the shared risk data accessible to other administrator devices; receive a removal input from that administrator device in response to the data removal prompt, where the removal input identifies selected confidential data from the identified potential confidential data; and remove the selected confidential data prior to the internal risk data being shared with other administrator devices.

In some embodiments, the organizational data can include a plurality of organizational profiles corresponding to the plurality of organizational networks; and the at least one risk assessment processor can be configured to: identify a plurality of similar organizational networks, where each similar organizational network has a similar organizational profile; and automatically assign the plurality of similar organizational networks to one of the organizational groups.

In some embodiments, the organizational group interface: can enable each administrator device to transmit an organizational group invitation to an additional computing devices associated with an additional organizational network, where the organizational group invitation corresponds to a selected organizational group in the plurality of organizational groups, and the organizational group invitation enables the additional computing device to access the organizational group interface for the selected organizational group.

In some embodiments, for each organizational network in at least one of the organizational networks, the at least one risk assessment processor can be configured to monitor the organizational risk associated with that organizational network by transmitting a risk data request to each of the user devices in the plurality of user devices associated with that organizational network; receiving a plurality of risk data responses from the user devices associated with that organizational network, each risk data response identifying a particular organizational risk and defining a plurality of risk attributes associated with the particular organizational risk; for at least one of the particular organizational risks, defining a risk assessment score by generating a risk evaluation template for that particular organizational risk, the risk evaluation template defining a plurality of risk assessment criteria based on the plurality of risk attributes associated with that particular organizational risk; transmitting the risk evaluation template to a plurality of assessment user devices in the plurality of users devices associated with that organizational network; receiving a plurality of risk evaluation responses from the plurality of assessment user devices, each risk evaluation response including user-specific values for the plurality of risk assessment criteria in the risk evaluation template; automatically generating a risk assessment score for the particular organizational risk based on the user-specific values in the plurality of risk evaluation responses, the risk assessment score defining an expected organizational impact of that particular organizational risk; and transmitting the risk assessment score for the particular organizational risk to at least one of the user devices associated with that organizational network.

In accordance with a broad aspect, there is provided a method for analyzing risk data for a plurality of organizational networks using at least one risk assessment processor in communication with the plurality of organizational networks and at least one non-volatile storage memory, the method including: monitoring, by the at least one risk assessment processor, organizational risk associated with each organizational network; storing, by the at least one non-volatile storage memory, risk data associated with a plurality of organizational risks, network data associated with each organizational network in the plurality of organizational networks, and organizational group data defining a plurality of organizational groups, where each organizational group is associated with at least one of the organizational networks in the plurality of organizational networks; providing, by the at least one risk assessment processor, a risk assessment platform that is remotely accessible by a plurality of administrator devices, the plurality of administrator devices including at least one administrator device associated with each of the organizational networks; defining, by the risk assessment platform, an organizational group interface accessible by each of the administrator devices, where the organizational group interface: enables each administrator device to associate one or more organizational groups with the organizational network associated with that administrator device; and for a particular organizational group, provides each administrator device associated with each organizational network associated with that particular organizational group with access to shared risk data from a plurality of sharing organizational networks associated with the particular organizational group, wherein the shared risk data includes internal risk data from each of the organizational networks in the plurality of sharing organizational networks, and the plurality of sharing organizational networks includes a plurality of unrelated organizational networks.

In accordance with a broad aspect, there is provided a non-transitory computer-readable medium storing computer-executable instructions, wherein the instructions when executed by at least one risk assessment processor configure the at least one risk assessment processor to perform a method for analyzing risk data for a plurality of organizational networks in communication with the at least one risk assessment processor and at least one non-volatile storage memory, the method including: monitoring, by the at least one risk assessment processor, organizational risk associated with each organizational network; storing, in the at least one non-volatile storage memory, risk data associated with a plurality of organizational risks, network data associated with each organizational network in the plurality of organizational networks, and organizational group data defining a plurality of organizational groups, where each organizational group is associated with at least one of the organizational networks in the plurality of organizational networks; providing, by the at least one risk assessment processor, a risk assessment platform that is remotely accessible by a plurality of administrator devices, the plurality of administrator devices including at least one administrator device associated with each of the organizational networks; defining, by the risk assessment platform, an organizational group interface accessible by each of the administrator devices, where the organizational group interface: enables each administrator device to associate one or more organizational groups with the organizational network associated with that administrator device; and for a particular organizational group, provides each administrator device associated with each organizational network associated with that particular organizational group with access to shared risk data from a plurality of sharing organizational networks associated with the particular organizational group, wherein the shared risk data includes internal risk data from each of the organizational networks in the plurality of sharing organizational networks, and the plurality of sharing organizational networks includes a plurality of unrelated organizational networks.

It will be appreciated by a person skilled in the art that a system, method or computer readable medium disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

A preferred embodiment of the present invention will now be described in detail with reference to the drawings, in which:

FIG. 10B illustrates an example risk data collection response message in accordance with an example embodiment;

Figure 1:
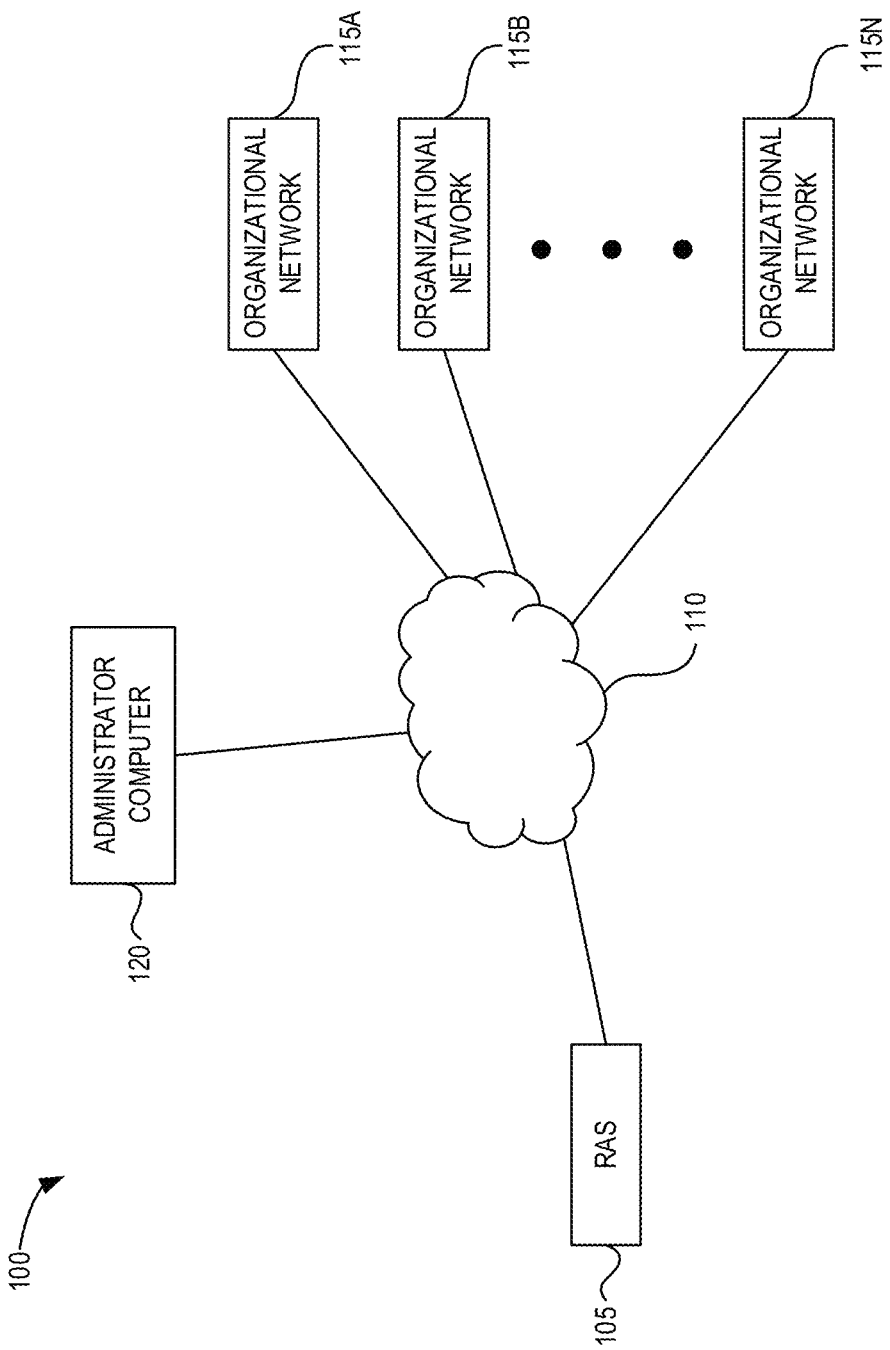
FIG. 1 is a block diagram of a distributed risk management system for a plurality of organizational networks in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Risk management is increasingly becoming an essential part of managing large and mid-size organizational networks. Organizational risk management is crucial to developing organizational networks and maintaining the operational status of the organizational network. Risk management processes that can proactively identify and manage organizational risks are important to the continued operation and growth of an organizational network. Identifying risk factors that may lead to organizational risks is also important to ensure that mitigation actions can be identified and implemented in a timely and effective manner.

Many organizational networks lack the internal expertise and/or personnel to effectively monitor organizational risks. Often, an administrator manually tracks known organizational risks using spreadsheet-based risk registers. However, this process requires significant expertise and oversight and often results in the organization tracking only risk events that have previously occurred or that the administrator is personally familiar with. As a result, many important organizational risks may be omitted during the risk identification and collection process.

Manual monitoring and tracking of organizational risk is also limited to risk data immediately accessible to the administrator or administrators performing the tracking. Administrators often lack access to comparative data from similar organizational networks within the same field or industry. This limited risk data is used by the administrator when subjectively assessing the likelihood and/or potential impact of a risk occurring. However, given the limited data available to an administrator, and their often limited experience, these risk assessments can be misleading and potentially inaccurate.

Furthermore, administrators may rely on these assessments and the limited risk data to identify and select preventative actions intended limit or reduce the likelihood and/or potential impact of an organizational risk. Accordingly, organizations may select inappropriate or inefficient preventative actions, which may ultimately result in harm to the organizational network, or increased harm as compared to more appropriate preventative actions.

Furthermore, a manual tracking process lacks the ability to monitor changes in organizational risks and underlying risk factors at a granular level. Changes to the underlying risk data, and corresponding changes to the assessments of organizational risks may also occur without oversight and/or notification. This may undermine the integrity of the risk data being assessed. This may also result in changes in risk assessments being identified too late to implement effective preventative actions.

Embodiments described herein may address various issues associated with previous approaches to monitoring and assessing organizational risk data. For instance, embodiments described herein may provide improved processes for collecting risk data and monitoring underlying risk indicator data. This may ensure that assessments of organizational risks take into account most, if not all, of the risk data that can meaningfully impact the organizational risk.

Embodiments of the systems and methods described herein may facilitate risk management for organizational networks. In particular, embodiments of the systems and methods described herein may provide increased awareness and a greater understanding of risks posed to the organizational network by various internal and external risk factors. Embodiments of the systems and methods described herein may also provide an improved ability to monitor underlying risk indicator data associated with organizational risks to identify and track changes in the organizational risks.

The embodiments described herein may provide a comprehensive identification and assessment of the risks posed to an organizational network. This may allow administrators to mitigate risks to the organizational network, e.g. by implementing preventative actions (also referred to as mitigations) or modifying ongoing preventative actions.

A risk assessment server may automatically trigger risk data collection from users associated with various organizational risks. The risk assessment server may trigger risk data collection processes on an ongoing basis to ensure that risk data being assessed is accurate and up-to-date.

Embodiments described herein may facilitate the identification and definition of organizational risks for an organizational network. A risk assessment server may collect risk data from a plurality of organizational networks. Risk data collected from similar organizational networks may be used to identify additional organizational risks and/or assess the organizational risks for a particular organizational network.

Embodiments described herein may also provide improved systems and processes for collecting user risk assessments associated with identified organizational risks. For instance, embodiments described herein may automatically generate risk assessment templates to collect risk assessment data from relevant users within the organizational network.

Some embodiments described herein may also identify underlying risk indicator data (corresponding to organizational risks) that is stored on computing devices within the organizational network. The risk assessment server may automatically retrieve this risk indicator data to update the corresponding risk assessments. This risk data monitoring and retrieval can occur on an ongoing basis to ensure that organizational risk assessments are accurate.

The risk assessment server may also trigger risk indicator data notifications to users associated with risk indicator data that may not be available automatically from the computing devices. The risk assessment server can transmit risk indicator data update requests to those users to update this offline risk indicator data.

The risk assessment server can also store the risk data and risk indicator data collected for an organizational network over time. The risk assessment server may identify trends in the risk data or risk levels, and can generate notifications to administrator users that particular organizational risks appear to be increasing. This tracking may also provide audit data to allow administrator users to track and identify when and where risk data changes have occurred.

Embodiments described herein may also provide improved systems and methods for assessing organizational risks. Embodiments described herein may analyze the collected risk assessment data and/or risk indicator data to generate risk assessment scores for the organizational risks. These risk assessments scores can be transmitted to corresponding administrator users to notify them of the risk levels associated with various organizational risks.

Embodiments described herein may continually update the risk assessments based on updated risk indicator data. This may ensure that system administrators can be notified on an on-going basis of organizational risk levels and any changes thereto.

In some cases, the risk assessment server may also include an escalating notification system. The risk assessment server may transmit risk assessment scores to additional users as risk levels increase.

The risk assessment server may also compare risk assessment scores collected from similar organizational networks to provide administrator users with comparative risk assessments. The risk assessment server can identify benchmark risk levels and risk scores for a particular organization type and display that benchmark data to administrator users to provide context for their risk assessment scores. This context may assist those administrator users in determining the appropriate preventative actions to undertake.

Furthermore, the risk assessment server can identify potential preventative actions for the administrator users based on preventative actions implemented in similar organizational networks. For example, the risk assessment server may identify preventative actions associated with positive risk outcomes and display those to the administrator user. This may provide the administrator user with additional preventative actions to implement rather than requiring skill and expertise to identify and implement appropriate preventative actions.

When an administrator implements preventative actions, the risk assessment server can automatically transmit action notifications to the users associated with the preventative actions. The risk assessment server can automatically transmit action item update notifications to those users on a periodic basis to determine the status of the action item. This ensures that action items are undertaken promptly and with increased diligence.

The risk assessment server may also be configured to identify organizational risks and/or risk indicator data that is common to multiple organizational networks. The risk assessment server may then provide each of the different organizational networks with access to the common risk data and/or risk indicator data. This may allow administrators to more readily identify risks to their associated organizational network. For example, the risk assessment server may identify sector-specific organizational risks associated with an organizational sector. Administrator users from organizational networks associated with those organizational sectors may then receive access to the identified sector-specific organizational risks.

In addition, the risk assessment server may provide a platform to facilitate cooperation between multiple organizational networks. The platform may allow administrator users to share internal risk data with other organizational networks. The shared risk data from one or more organizational networks can be used to identify risks that are common to multiple organizational networks, such as sector-specific risks. In addition, the platform may facilitate cooperative risk mitigation between multiple organizational networks.

The risk assessment server may also protect organizational data security and confidentiality while facilitating the sharing of risk data. When an administrator user attempts to share data on the shared platform, the risk assessment server may identify potentially confidential risk data. This confidential data may then be removed from the risk data prior to sharing with other organizational networks.

The risk assessment server may also translate the shared risk data to a common format or nomenclature. For example, the risk assessment server may provide administrator users with shared risk templates through the shared platform. The shared risk templates can be used to define the internal risk data within each organizational network. The risk assessment server may then integrate the shared risk data using the risk templates to provide a common format for the shared risk data. This may allow organizational networks to more easily identify additional organizational risks and to integrate that data into their internal risk management systems.

The risk assessment server may also provide ongoing risk data feeds through the shared platform. The risk data feeds may provide administrator users with real-time, or substantially real-time, risk data and risk indicator data. This may allow the administrator users to identify dynamic organizational risks and implement mitigation actions in a timely manner.

Referring now to FIG. 1, there is provided is a block diagram of a risk management computer network system 100 in accordance with an example embodiment. Risk management system 100 is configured to provide monitoring and analysis of organizational risks and risk data for a plurality of organizational networks 115A-115N.

Computer network system 100 generally comprises a plurality of computers connected via data communication network 110, which itself may be connected to the Internet. In general, however, the computer network system 100 includes a risk assessment server (RAS) 105, one or more administrator computers 120, and a plurality of organizational networks 115A-115N (each comprising a plurality of computing devices) connected via network 110.

Typically, the connection between network 110 and the Internet may be made via a firewall server (not shown). In some cases, there may be multiple links or firewalls, or both, between network 110 and the Internet. Some organizations may operate multiple networks 110 or virtual networks 110, which can be internetworked or isolated. These have been omitted for ease of illustration, however it will be understood that the teachings herein can be applied to such systems. Network 110 may be constructed from one or more computer network technologies, such as IEEE 802.3 (Ethernet), IEEE 802.11 and similar technologies.

Computers and computing devices may be connected to network 110 or a portion thereof via suitable network interfaces. Computing devices may also encompass any connected or "smart" devices capable of data communication, such as thermostats, air quality sensors, industrial equipment and the like. Increasingly, this encompasses a wide variety of devices as more devices become networked through the "Internet of Things". In some cases, one or more of the computing devices such as the computing devices in organizational networks 115 may connect to network 110 via the Internet.

Examples of computers include the remote administrator computer 120, such as a desktop or laptop computer, which can connect to network 110 via a wired Ethernet connection or a wireless connection. The remote administrator computer 120 may also connect to the network 110 via the Internet. Remote administrator computer 120 has a processor, volatile memory and non-volatile storage memory, at least one network interface, input devices such as a keyboard and trackpad, output devices such as a display and speakers, and various other input/output devices as will be appreciated.

As with all devices shown in computer network system 100, there may be multiple administrator computers 120, although not all are shown. For instance, each organizational network 115 may have one or more organizational administrator computers.

Similarly, the computing devices associated with organizational networks 115 can include various computing devices, such as smartphones, desktop, laptop or tablet computers, however the computing devices may also include a wide variety of "smart" devices capable of data communication. Like computer 120, the computing devices associated with organizational networks 115 have a processor, volatile and non-volatile memory, at least one network interface, and input/output devices. Each of the computers and computing devices may at times connect to external computers or servers via the Internet.

Risk assessment server 105 is a computer or computer server, and has a processor, volatile and non-volatile memory, at least one network interface, and may have various other input/output devices. As shown, risk assessment server 105 is linked to network 110. However, in other embodiments, risk assessment server 105 may be outside network 110 and linked to the Internet. The risk assessment server 105, administrator computer 120 and a computing device 215 associated with one of the organizational networks 115 are described in greater detail with reference to FIG. 2 below.

Risk assessment server 105 may be configured to collect, analyze, and monitor risk data associated with each of the organizational networks 115. For instance, risk assessment server 105 may collect risk data related to strategic, operational, market, liquidity, credit and other organizational risks for each organizational network 115. The risk assessment server 105 can communicate with each of the organizational networks 115 to monitor organizational risks associated with each organizational network 115.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs. For example, for many organizations, important applications and services rely on regular input from spreadsheets that may be obtained from third parties, so these spreadsheets may be identified as software applications.

In embodiments described herein, the RAS 105 may be configured to provide a risk assessment platform. The risk assessment platform may be remotely accessible by computing devices associated with each of the organizational networks 115.

The risk assessment platform may be provided in various forms. For example, the risk assessment platform may be a webpage or web-based software application that can be accessed through a browser application operating on the computing device. Alternately or in addition, the risk assessment platform may be accessed through a local risk assessment application operating locally on a computing device.

Figure 2:
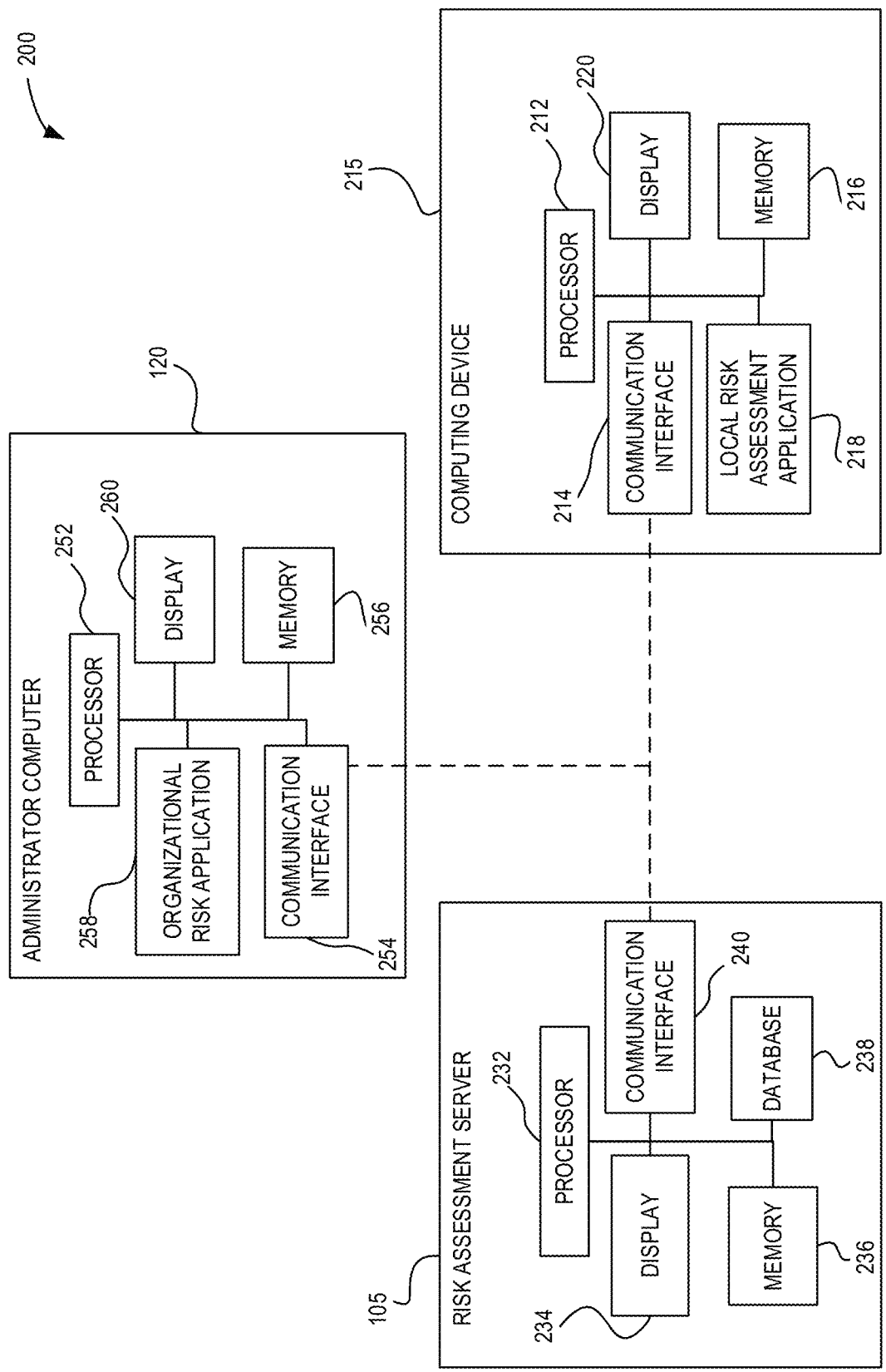
FIG. 2 is a block diagram of an organizational risk management system in accordance with an example embodiment.

Referring now to FIG. 2, there is shown a block diagram of a risk assessment system 200 in accordance with an example embodiment. Risk assessment system 200 is an example of an organizational risk management system for one of the organizational networks 115 shown in FIG. 1.

Risk assessment system 200 is constructed from risk assessment server (RAS) 105, an administrator computer 120 and at least one computing device 215 associated with the organizational network 115. In some cases, the administrator computer 120 may be omitted from organizational risk assessment system 200, for instance where no independent administrator computer 120 is provided for that organization. In some other cases, the administrator computer 120 and RAS 105 may be integrated or co-located. In some cases, the administrator computer 120 may be provided by one of the computing devices 215 but associated with a user having administrative privileges.

Typically, the RAS 105 will be in communication with a plurality of computing devices 215 associated with the organizational network. Each of the computing devices 215 can be associated with users who perform functions associated with the organization.

RAS 105 may be directly linked to administrator computer 120, for example, via a Universal Serial Bus, Bluetooth™ or Ethernet connection. Alternatively, RAS 105 may be linked to administrator computer 120 via network 110 or, in some cases, the Internet. RAS 105 may also be linked to computing devices 215 via network 110 or, in some cases, the Internet.

RAS 105 has a processor 232, a display 234, a memory 236, a communication interface 240 and a database 238. Although shown as separate elements, it will be understood that database 238 may be stored in memory 236.

Processor 232 is a computer processor, such as a general purpose microprocessor. In some other cases, processor 232 may be a field programmable gate array, application specific integrated circuit, microcontroller, or other suitable computer processor.

Processor 232 is also coupled to display 234, which is a suitable display for outputting information and data as needed by various computer programs. In particular, display 234 may display a graphical user interface (GUI). In some cases, the display 234 may be omitted from risk assessment server 105, for instance where the risk assessment server 105 is configured to operate autonomously. In such cases, the RAS 105 may be configurable using a computer such as the administrator computer 120 that is connected to the RAS 105. RAS 105 may execute an operating system, such as Microsoft Windows™, GNU/Linux, or other suitable operating system.

Communication interface 240 is one or more data network interface, such as an IEEE 802.3 or IEEE 802.11 interface, for communication over a network.

Processor 232 is coupled, via a computer data bus, to memory 236. Memory 236 may include both volatile and non-volatile memory. Non-volatile memory stores computer programs consisting of computer-executable instructions, which may be loaded into volatile memory for execution by processor 232 as needed. It will be understood by those of skill in the art that references herein to RAS 105 as carrying out a function or acting in a particular way imply that processor 232 is executing instructions (e.g., a software program) stored in memory 236 and possibly transmitting or receiving inputs and outputs via one or more interface. Memory 236 may also store data input to, or output from, processor 232 in the course of executing the computer-executable instructions. As noted above, memory 236 may also store database 238.

In some example embodiments, database 238 is a relational database. In other embodiments, database 238 may be a non-relational database, such as a key-value database, NoSQL database, or the like. The database 238 may store risk data that can be accessed and used by the RAS 105 to identify and analyze organizational risks.

The database 238 can store risk data associated with a plurality of organizational risks. For example, the database 238 may store a plurality of previously identified organizational risks. The previously identified organizational risks stored in database 238 may include organizational risks previously identified in association with one of the organizational networks. Additionally or alternatively, the previously identified organizational risks can include administrator-defined organizational risks that can be defined by a user of administrator computer 120.

The RAS 105 may store a plurality of risk attributes associated with each previously identified organizational risk. Examples of risk attributes can include a risk identifier, an associated risk owner (e.g. an organizational user associated with or responsible for management of that risk; the associated risk owner may be defined as a specific user and/or a user role within the organizational network), an associated operational function related to that risk, a potential risk impact, a risk likelihood, a risk tolerance etc. When collecting risk data for a particular organizational network 115, the RAS 105 may use the stored risk attributes to determine whether the risk data collected from an organizational network 115 corresponds to a previously identified organizational risk. For example, the RAS 105 may determine that an identified organizational risk corresponds to a previously identified organizational risk (e.g. from a different organizational network) when the risk attributes of the identified organizational risk and the previously identified organizational risk have a similarity score above a predefined threshold.

The RAS 105 may also determine that a new, user-generated organizational risk is included in the risk data received from an organizational network. The RAS 105 may then store the user-generated organizational risk, and associated risk attributes in the database 238 to update the known, previously identified organizational risks. The RAS 105 can thus generate an extensible set of previously-identified and defined organizational risks from a plurality of different organizational networks.

The RAS 105 may also define a plurality of risk types for the various organizational risks using the stored risk attributes. Each previously identified organizational risk can be associated with a particular risk type or risk category. Grouping the organizational risks into risk types/categories may facilitate the assessment of organizational risks by pre-populating or partially pre-populating risk assessment templates for organizational risks within the same risk type/category.

The database 238 can also store a network association between each previously-identified organizational risks and each of the organizational networks 115 in which that risk was identified.

The database 238 can also store user profiles for users associated with the computing devices in each of the organizational networks 115. The user profiles may identify roles and/or permissions associated with a corresponding user. In some cases, the user profiles may also identify one or more risk types associated with that user. The risk types associated with a user may correspond to aspects of the organizational network with which that user interacts. For example, user profiles corresponding to users having IT functions in the organizational network may be associated with cybersecurity and/or device security risk types.

In some cases, the user profiles may also include a user weighting. The user weighting may represent a value used to weight risk assessments received from that user. For instance, users having a lower level of operational responsibility may be associated with lower user weightings than users having a greater level of organizational responsibility. Additionally or alternatively, user weightings may be adjusted based on the relevance of a particular risk type to that user's operational function.

In some cases, the RAS 105 may identify risk indicator data associated with the organizational risks stored in database 238 for a particular organization. The risk indicator data may be data that reflects the underlying risk factors associated or correlated with the particular organizational risk. The RAS 105 can also identify one or more computing devices and/or users that manage and/or store the risk indicator data for each organizational risk. The RAS 105 can store this risk indicator data location information in the database 238 to allow the RAS 105 to automatically monitor and collect risk indicator data on an ongoing basis.

For example, underlying risk indicator data related to potential cybersecurity breaches may include the number of user mobile devices within the organizational network 200 that are considered high-risk based on the presence of high-risk mobile applications. The RAS 105 may continually monitor the number of high-risk mobile devices to ensure that risk assessments related to cybersecurity breaches are accurate.

The database 238 may also store risk threshold data for the various organizational networks 115. The risk threshold data may include a risk tolerance threshold for each organizational risk identified for an organizational network. In some cases, the risk tolerance threshold may be defined by an administrator user in the organizational network in response to the organizational risk being identified. In some cases, the risk tolerance threshold may be defined initially by RAS 105 as a benchmark risk tolerance threshold, e.g. based on risk data collected from other similar organizational networks.

The RAS 105 may communicate with a plurality of additional organizational networks as shown in FIG. 1. The database 238 can store network data associated with each organizational network in the plurality of organizational networks. For example, the network data stored by database 238 may include organizational profiles corresponding to each of the organizational networks 115.

These organizational profiles may define organizational characteristics of an organizational network, such as organization size and organization sector. The organizational profiles can include, or be associated with, organizational risks previously identified for the corresponding network. The database 238 can also store risk outcomes for those previously-identified organizational risks in the organizational profiles. The RAS 105 may also aggregate the previously-identified risk and risk outcomes for multiple organizational networks in database 238.

The database 238 can store organizational group data defining a plurality of organizational groups. In some examples, an organizational group may be defined based on characteristics of the organizational networks, such as network size, network location and/or organizational sector for example. In some examples, an organizational group may be defined by an administrator user (e.g. the organizational group may not be restricted by specific network characteristics). The RAS 105 may be configured to associate each organizational group with at least one of the organizational networks in the plurality of organizational networks.

The RAS 105 can be configured to provide a risk assessment platform to computing devices associated with the organizational networks 115. The risk assessment platform may be remotely accessible by the computing devices using a communication network (e.g. over the Internet).

The risk assessment platform may provide the computing devices associated with networks 115 with a shared online risk assessment portal. Users from multiple different organizational networks may communicate and share risk data through the risk assessment platform. The risk assessment platform can be configured to provide secure and confidential sharing of risk data. The risk assessment platform may also allow users from multiple organizational networks to implement collaborative risk management processes in a simple and efficient manner. The risk assessment platform may operate in conjunction with the local risk assessment applications used to monitor internal organizational risks associated with networks 115.

The risk assessment platform can associate the organizational networks 115 with one or more organizational groups. For example, each organizational network 115 may be automatically associated with one or more organizational group based on the characteristics of that organizational network (e.g. network size, network location, organizational sector etc.). Alternately or in addition, the RAS 105 may identify similar organizational networks and group the similar organizational networks into organizational groups.

The risk assessment platform can define an organizational group interface accessible by administrator devices associated with organizational networks 115. The organizational group interface can enable each administrator device to associate one or more organizational groups with the organizational network associated with that administrator device. The organizational group interface may also allow administrator devices to define custom organizational groups.

Each organizational group can be associated with one or more organizational networks 115. An organizational network 115 may be associated with an organizational group within the risk assessment platform.

The RAS 105 can be configured to define the plurality of organizational groups to include a plurality of sector-specific groups. Each sector-specific group can correspond to a specific organizational sector. The RAS 105 can also define sector-specific risk assessment templates for each of the specific organizational sectors. In some cases, the sector-specific risk assessment templates may be unique to a particular sector. Alternately or in addition, the sector-specific risk assessment templates may include a set of risk assessment templates that corresponds to risks expected to be associated with the particular sector.

The risk assessment platform can enable each administrator device to associate one or more sector-specific organizational groups with the organizational network associated with that administrator device. The one or more sector-specific organizational groups can corresponding to the specific organizational sector of the organizational network associated with that administrator device. For each sector-specific organizational group, the risk assessment platform can provide each administrator device associated with each organizational network associated with that sector-specific organizational group with the sector-specific risk templates associated with the specific organizational sector that corresponds to that sector-specific organizational group.

In some cases, an organizational network 115 may be associated with an organizational group automatically by RAS 105 (e.g. based on organizational characteristics and/or similarity).

For example, the RAS 105 may identify a plurality of similar organizational networks using the organizational profiles. Each similar organizational network may be identified as having a similar organizational profile. The RAS 105 may then automatically assign the plurality of similar organizational networks to one of the organizational groups.

Alternately or in addition, administrator users associated with the organizational networks 115 may interact with the risk assessment platform to associate an organizational network 115 with an organizational group. For example, administrator users associated with the organizational networks 115 may interact with the risk assessment platform to define one or more organizational groups. This may provide administrator users with greater flexibility to group organizational networks. For example, an organizational network 115 may be associated with an organizational group in response to an invitation to that organizational group. Administrator users of organizational networks already associated with an organizational group may transmit invitations to administrator users associated with additional networks to prompt those networks to be associated with the organizational group. This process may allow administrator users to define organizational group associations in a highly targeted and flexible manner.

For example, an administrator user may establish an organizational group within the risk assessment platform. The administrator user may specify one or more administrator users (themselves and/or other administrator users) as a moderator for the organizational group. Moderators may have increased privileges as compared to other administrator users associated with the organizational group. For instance, the ability to invite and/or permit other organizational networks (or related administrator users) to join an organizational group may be restricted to the moderators of that group.

The organizational group interface may enable each administrator device (or moderator administrator device) to transmit an organizational group invitation to an additional computing device associated with an additional organizational network. The organizational group invitation can correspond to a selected organizational group in the plurality of organizational groups. The organizational group invitation can enable the additional computing device to access the organizational group interface for the selected organizational group.

In some cases, the organizational group invitation may enable additional computing devices associated with organizational networks not previously registered with RAS 105 (or not having an organizational profile stored in database 238) to access the organizational group interface. Where an additional computing device is associated with an organizational network that is otherwise not associated with, or subscribed to services provided by, RAS 105, the additional computing device may be limited in its ability to navigate the risk assessment platform. For instance, the additional computing device may be restricted to navigating the organizational group to which the organizational group invitation relates.

Within the risk assessment platform, the organizational groups may provide risk management communities for the associated organizational networks. Each organizational group may provide a corresponding communication platform or forum within the risk assessment platform. This may facilitate sharing of risk data and coordination of mitigation actions between administrator users associated with different organizational networks 115. Access to the platform or forum associated with a particular organizational group may be restricted to users associated with the organizational networks 115 associate with that particular organizational group.

The organizational group interface can, for a particular organizational group, provide each administrator device associated with each organizational network associated with that particular organizational group with access to shared risk data. The shared risk data can be provided by a plurality of sharing organizational networks associated with the particular organizational group.

The 'sharing' organizational networks may refer to those organizational networks associated with that particular organizational group that have chosen to share risk data. The shared risk data can include internal risk data from each of the organizational networks in the plurality of sharing organizational networks. In some cases, all of the organizational networks associated with the particular group may share internal risk data.

The plurality of sharing organizational networks can include a plurality of unrelated organizational networks. That is, the sharing organizational networks can include multiple, different organizational networks that can share risk data through the risk assessment platform.

By allowing organizational networks 115 to share internal risk data, the risk assessment platform may facilitate the identification of common risks between organizational networks. This may also facilitate the identification and mitigation of broader risks affecting multiple organizational networks 115.

The organizational group interface provided by the risk assessment platform can enable an administrator device to share internal risk data (e.g. internal sector-specific risk data) with the organizational groups associated with the corresponding organizational network. However, prior to sharing the internal risk data with other organizational networks, the RAS 105 can identify and remove confidential data from the internal risk data shared by each of the administrator devices. This may ensure that confidential data is omitted from the data stream provided to the other organizational networks in the organizational group.

In some examples, the RAS 105 can be configured to, for each administrator device sharing internal risk data, identify potential confidential data in the internal risk data (e.g. internal sector-specific risk data) being shared by that administrator device. The RAS 105 may then automatically remove the identified confidential data prior to the internal risk data being included in the data stream of shared risk data provided to the organizational group.

Alternately or in addition, RAS 105 can generate a data removal prompt for that administrator device prior to including the internal risk data in the shared risk data accessible to other administrator devices. The data removal prompt can be generated within the risk assessment platform and/or through the local risk assessment application 218.

The data removal prompt can notify the administrator user that potentially confidential data has been identified in the internal risk data being shared. The data removal prompt can also identify the potentially confidential data to the administrator user. The data removal prompt may provide the administrator user with a removal interface usable to select potentially confidential data to be removed from the shared risk data.

The RAS 105 can receive a removal input from the administrator device in response to the data removal prompt. The removal input may be generated by the administrator device through the removal interface. The removal input can identify selected confidential data from the identified potential confidential data. The RAS 105 can then remove the selected confidential data prior to the internal risk data being shared with other administrator devices (e.g. via an organizational group data stream).

The organizational group interface can also provide a data stream corresponding to each organizational group. Each organizational group can have a corresponding data stream that includes risk data for that organizational group. The data stream can be provided through the organizational group interface in real-time or near real-time.

For example, the organizational group interface can define, for each sector-specific organizational group, a data steam of sector-specific risk data for the specific organizational sector that corresponds to that sector-specific organizational group. The data stream of sector-specific risk data can include a real-time or near-real-time stream of risk data related to risks common to organizational networks within that specific organizational sector.

The organizational group interface can also provide a risk sharing interface for the organizational groups. The risk sharing interface may enable each administrator device associated with a particular organizational group (e.g. a sector-specific organizational group) to link internal risk data (e.g. internal sector-specific risk data) to the data stream of risk data (e.g. sector-specific risk data). The data stream provided to the organizational group can then include the linked internal risk data. As explained above, RAS 105 may be configured to identify and/or remove confidential data from the linked internal risk data prior to including the internal risk data in the data stream.

In some examples, RAS 105 may be configured to monitor risk data associated with the plurality of organizational networks. The RAS 105 may identify popular risk data for a specific organizational group or specific organizational sector. For example, the RAS 105 may monitor interactions from the organizational networks 115 associated with the specific organizational group or specific organizational sector. The RAS 105 may identify popular risk data based on risk data that has a number of interactions above a popularity threshold. The popularity threshold may be a static threshold in some instances. Alternately the popularity threshold may be determined dynamically, for instance based on an average number of interactions with risk data items.

The RAS 105 can include the identified popular risk data in the data stream provided to the corresponding organizational group or groups. In some cases, the RAS 105 may further mark the popular risk data in the data stream to highlight for administrator users that the risk data is popular risk data.

In some examples, RAS 105 may also monitor interactions with risk data included in the risk data stream provided to one or more organizational groups. RAS 105 may also identify popular risk data based on the level of interactions with the risk data items in the risk data stream(s).

The RAS 105 may access the organizational profiles stored in database 238 to identify similar organizational networks based on the organizational characteristics. This may facilitate identification of potential additional risks for an organizational network (e.g. based on previously identified risks associated with similar networks) and/or be used to generate risk assessment scores based on previous risk outcomes.

The RAS 105 can also store risk assessment scores for the organizational risks associated with each organizational network 115 in the database 238. The RAS 105 can monitor and update the stored risk assessment scores to allow a risk trend to be identified. The stored risk assessment scores may enable the RAS 105 to define comparative risk assessment scores for similar organizational networks.

The memory 236 on RAS 105 may store a software application referred to herein as a risk data assessment application. The risk data assessment application may be configured to collect risk data and identify organizational risks associated with an organizational network 115, and to determine and monitor risk assessment scores for those organizational risks.

Computing device 215 is generally a computer such as a desktop computer, laptop computer, smartphone or tablet or other "smart" device that may be networked through the "Internet of Things". Computing device 215 has a processor 212, a communication interface 214 for data communication with communication interfaces 240 and 254, a display 220 for displaying a various GUIs, such as risk collection and risk data reporting GUIs for example, and a memory 216 that may include both volatile and non-volatile elements. As with RAS 105, references to acts or functions by computing device 215 imply that processor 212 is executing computer-executable instructions (e.g., a software program) stored in memory 216.

For instance, a local risk assessment application 218 may be stored on the computing device 215. Although shown separately from memory 216, it will be understood that local risk assessment application 218 may be stored in memory 216. The local risk assessment application 218 may communicate with the risk data assessment application of RAS 105 to assist the RAS 105 in collecting risk data, collecting user assessments of risk data, and providing feedback to users regarding organizational risks and risk assessment scores. Although the local risk assessment application 218 is shown as installed on computing device 215, the local risk assessment application 218 may be otherwise accessible to the computing device 215 for instance as a cloud application accessible to the computing device 215 over a network such as the Internet.

The risk data assessment application of RAS 105 may remotely monitor risk indicator data stored on the computing device 215, e.g. using the local risk assessment application 218. The local risk assessment application 218 may continually transmit the risk indicator data to the RAS 105, e.g. as changes are detected or on an intermittent basis. The local risk assessment application 218 may also display notifications generated by RAS 105, e.g. to collect risk evaluation responses and/or updated risk indicator data from a user of the computing device 215.

Examples of graphical user interfaces that may be displayed by local risk assessment application 218 using display 220 are discussed below with reference to FIGS. 10A and 10B.

Administrator computer 120 is generally a computer similar to risk assessment server 105. The administrator computer 120 has a processor 252, a communication interface 254 for data communication with communication interfaces 220 and 240, a display 260 for displaying an organizational risk assessment GUI, and a memory 256 that may include both volatile and non-volatile elements. As with RAS 105, references to acts or functions by administrator computer 120 imply that processor 252 is executing computer-executable instructions (e.g., a software program) stored in memory 256.

An organizational risk assessment application 258 may be stored on the administrator computer 130. Although shown separately from memory 256, it will be understood that organizational risk assessment application 258 may be stored in memory 256.

As mentioned, the administrator computer 120 may be provided by one of the computing devices 215 but associated with a user having administrative privileges. Accordingly, although the organizational risk application 258 and local risk assessment application 218 are shown as different applications, in some embodiments they may correspond to the same application albeit with different features and/or permissions for each user.

For example, the RAS 105 can store user profiles associated with a plurality of users for the organizational network 200. Each user profile can be associated with a corresponding permission level. A user may enter a distinct user ID and password combination when accessing the local risk assessment application 218 (or when accessing their computing device 215). The operations permitted through the local risk assessment application 218 or organizational risk assessment application 258 may then be adjusted based on the permission level associated with that user.

The organizational risk assessment application 258 may communicate with the risk data assessment application of RAS 105 to configure network acceptable risk tolerance thresholds, and other settings of the risk data assessment application. The RAS 105 may also monitor changes to the organizational risk settings and risk data entered by each user in association with their user ID. This change data can be stored in database 238 to allow RAS 105 and/or an administrator to identify the users associated with changes in risk data.

Although the organizational risk assessment application 258 is shown as installed on administrator computer 130, the organizational risk assessment application 258 may be otherwise accessible to the administrator computer 130 for instance as a cloud application accessible to the administrator 130 over a network such as the Internet.

The RAS 105 may also communicate risk assessment scores and related risk data from similar organizational networks for the organizational network to the organizational risk assessment application 258. The organizational risk assessment application 258 may provide graphical user interfaces to allow an administrator of the organizational network to review risk assessment scores, comparative risk assessment scores and potential preventative actions. The organizational risk assessment application may allow the administrator to set and adjust organizational rules for allowing/preventing access to the organizational network and policies for operations within the organizational network. Examples of graphical user interfaces that may be displayed by organizational risk assessment application 258 (or local risk assessment application 218 when operated by an administrator user) using display 260 are discussed below with references to FIGS. 7, 8, 9 and 11.

The RAS 105, computing device 215 and administrator computer 120 may have various additional components not shown in FIG. 2. For example, additional input or output devices (e.g., keyboard, pointing device, etc.) may be included beyond those shown in FIG. 2.

The local risk assessment application 218 may be a downloadable application, such as a mobile application, provided by the risk assessment server 105. A user of the computing device 215 may download the local risk assessment application 218 from RAS 105 or through an app store such as the Apple App Store or Google Play. In other cases, the local risk assessment application 218 may be a web-based application accessed by a user of the computing device 215, over a network such as network 110 or the Internet.

Figure 3:
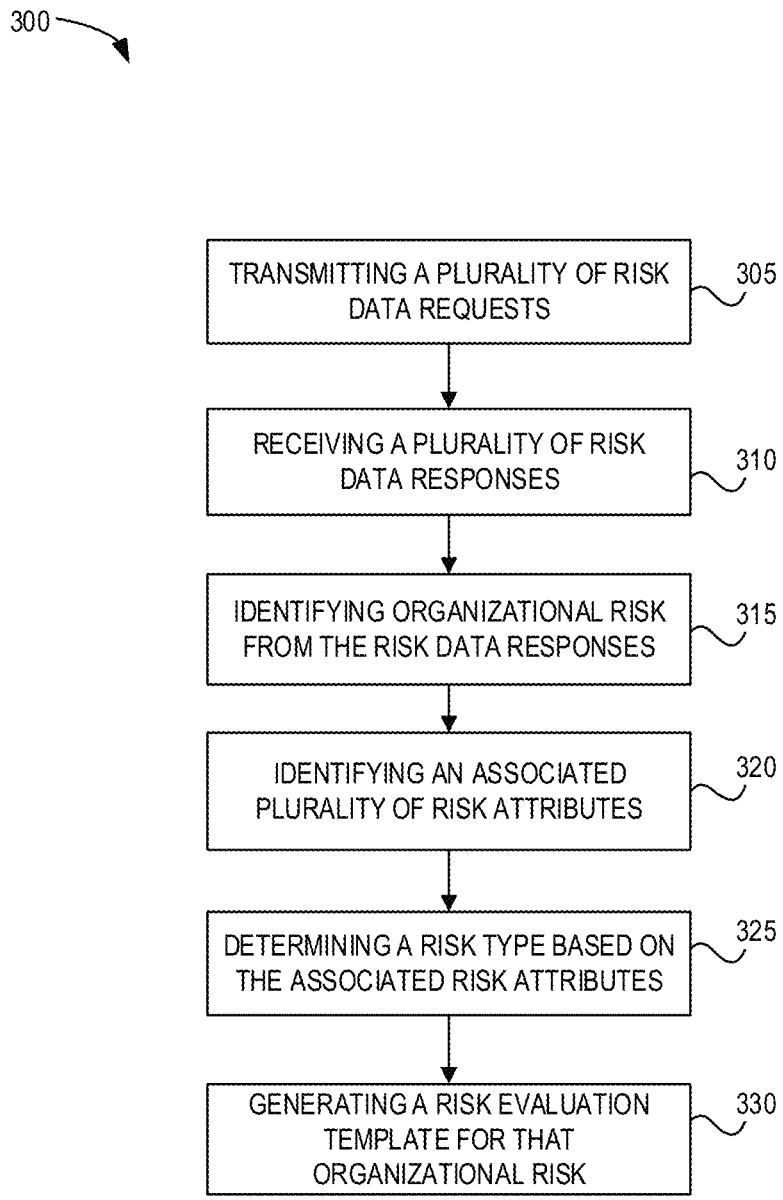
FIG. 3 is a flowchart illustrating a method of identifying risk data for an organizational network in accordance with an example embodiment.

Referring now to FIG. 3, shown therein is a flowchart illustrating a method or process 300 of identifying risk data for an organizational network. Method 300 may be carried out by various components of system 200, such as the RAS 105 and the computing device 215.

At 305, the risk assessment server 105 can transmit a plurality of risk data requests. The risk assessment server 105 can transmit the risk data requests to a plurality of computing devices associated with an organizational network. The risk data requests may be sent to computing devices associated with users whose roles within the organizational network relate to potential risks. The users may then access and respond to the risk data requests using the local risk assessment application 218.

In general, the risk assessment server 105 can direct risk data requests to users identified as being responsible for, or associated with, the oversight of various organizational functions. For example, the users whose roles identify them as being responsible for a particular organizational function may receive the risk data requests. The particular roles and organizational functions can vary based on the size and type of the organizational network 115. Examples of relevant organizational functions can include sales, operations, finance and human resources.

The users may be identified by a user of administrator computer 130. In some cases, the risk assessment server 105 may also identify the users based on user roles identified previously by other similar organizational networks.

Risk data requests may also be directed to users associated with key risk indicator data. In some cases, such users may be automatically prompted to update key risk indicator data at defined intervals.

The risk data requests can include a risk identification template for a user to identify and/or define one or more organizational risks. The template may also provide various attributes fields to allow a user to define risk attributes associated with the organizational risks.

In some cases, the risk identification template may be dynamic to provide a user with access to different attribute fields based on the risk being defined. For example, the risk identification template may include an initial list or drop-down menu of previously identified organizational risks.

These previously identified organizational risks may be defined based on data from other organizational networks, an administrator of RAS 105, and/or an administrator user for the organizational network. If the user selects a previously identified organizational risk, the template may be re-configured to provide attribute fields corresponding to that previously identified organizational risk. Examples of attribute fields can include potential risk impact, risk likelihood and risk tolerance related to that risk.

An example of a previously-identified organizational risk is a foreign exchange risk. This risk may relate to potential increases in costs, or reductions in revenue, caused by changes in foreign exchange rates.

In some cases, the risk identification template may also include a new risk definition template. A user may determine that the risk they are identifying does not correspond to any of the previously identified organizational risks. The user may then select the new risk definition template through the local risk assessment application 218. The new risk definition template may include a plurality of pre-defined attribute fields. The new risk definition template may also be re-configured by the user to add additional attribute fields for the organizational risk being defined. This allows the risk management system to provide the organizational network with flexibility to define additional organizational risks, while also provided a streamlined and easy to use risk data collection process.

At 310, the risk assessment server 105 can received a plurality of risk data responses. The risk data responses may corresponds to the data input into the risk identification templates in the risk data request.

Each risk data response can identify a particular organization risk (e.g. a previously identified organizational risk or a user-generated organizational risk). The risk data response can also include a plurality of risk attributes associated with the particular organizational risk.

At 315, the risk assessment server 105 can identify one or more organizational risks from the risk data responses. At 320, the risk assessment server 105 can identify a plurality of risk attributes associated with each organizational risk identified at 315.

The RAS 105 may analyze the organizational risks and corresponding risk attributes received at 310 to identify corresponding organizational risks. The RAS 105 may then identify one or more unique or distinct organizational risks based on this analysis. This may facilitate de-duplication of organizational risks in cases where the same organizational risk is identified in multiple risk data responses.

For example, the RAS 105 may define a risk similarity threshold for identifying corresponding organizational risks. The RAS 105 may then compare the risk attributes in all of the received risk data responses to identify corresponding organizational risks. For instance, the RAS 105 may define risk clusters based on the risk attributes in the received risk data responses and compare the risks within each cluster to one another to determine if they are sufficiently similar to be considered duplicative organizational risks.

In some cases, the RAS 105 may determine that the organizational risks identified in at least two of the risk data responses correspond to the same organizational risk. The RAS 105 identify a particular unique organizational risk by correlating and combining the organizational risks identified in the at least two risk data responses. The risk attributes associated with the particular unique organizational risk can then be defined by combining the risk attributes associated with the organizational risks identified in the at least two risk data responses. In some cases, the RAS 105 may provide a notification to an administrator user to confirm that the duplicative risks identified by RAS 105 should be combined into a single distinct organizational risk.

The RAS 105 may compare the received risk attributes for the organizational risks with the risk attributes of previously identified organizational risks stored in database 238 to determine whether any of the organizational risks are user-generated organizational risks. Thus, the RAS 105 may confirm whether the organizational risks are actually new risks defined by the users, or if they correspond to previously known risks (e.g. to account for differing subject definitions of risk). If the organizational risk is a user-generated organizational risk, the RAS 105 can update the plurality of previously identified organizational risks stored on the database 238 to include the user-generated organizational risk.

The process of identifying organizational risks and risk attributes may be an iterative process. For example, where a risk data response partially defines an organizational risk with attributes that may correspond to multiple previously-known organizational risks, the RAS 105 may prompt one or more of the computing devices to define additional attributes based on the potentially expected attributes of the previously-known organizational risks.

The RAS 105 may also identify additional attributes to be requested for organizational risks identified at 315. Accordingly, the RAS 105 may transmit additional risk data requests to the computing devices 215 to request the additional attributed data.

At 325, the risk assessment server 105 can determine a risk type of each organizational risk based on the associated risk attributes. The risk type or category may define general characteristics of the risk, such as the organizational sectors impacted, e.g. information technology risks, financial risks, legal risks etc. The various risk types may be pre-defined by an administrator user for the organizational network. In some cases, default risk types may be initially defined by RAS 105 and may be updated using the organizational risk assessment application 258 on the administrator computer 120. The risk type identified at 325 may also facilitate the identification of appropriate users for risk evaluation and/or preventative actions.

At 330, the risk assessment server 105 can generate a risk evaluation template for each organizational risk. The risk evaluation template can include a plurality of risk assessment criteria associated with that organizational risk. The RAS 105 can define the plurality of risk assessment criteria based on the risk attributes associated with the organizational risk. The risk assessment criteria may include objective risk assessment criteria as well as subjective risk assessment criteria.

Risk impact attributes may vary for different risk types. Examples of risk assessment criteria related to an expected risk impact can include a technology downtime criterion, a business downtime criterion, a revenue impact criterion, a net income impact criterion, and a reputational impact criterion. For example, a risk of having an internet facing application accessed by a third party may be associated with both a reputational impact criterion and a technology downtime criterion. As another example, a natural disaster risk may be associated with a technology downtime criterion and a business downtime criterion.

Risk likelihood assessment criterion may be defined in terms of estimated probability of the risk occurring. The risk assessment criteria can include subjective user estimates of risk likelihood, such as "rare", "unlikely", "possible", "likely", "almost certain" for example which may be correlated to a subjective estimate score or rating. The risk assessment criteria may also include historical risk occurrence frequency within the organization. The RAS 105 may also assess various other risk likelihood criteria when evaluating risk likelihood, such as changes to key risk indicator data as risk likelihood data from similar organizational networks.

Risk mitigation assessment criteria may vary based on the types of risks associated with an organizational risk. For example, the risk mitigation assessment criteria may be identified based on risk mitigation processes currently implemented by the organizational network for each risk. The risk mitigation assessment criteria can include an expected mitigation/control effectiveness criteria for each mitigation process currently implemented for a particular risk. In some cases, the RAS 105 may also automatically evaluate some risk mitigation criteria, such as those associated with electronic risk mitigations.

In some cases, the risk evaluation template can be defined based on risk evaluation templates generated for similar organizational risks. For example, where the organizational risk is a newly identified user-generated organizational risk, the RAS 105 may pre-populate, or partially pre-populate the risk evaluation template based on the risk type of that organizational risk. For instance, the RAS 105 may identify risk assessment criteria that are included in the risk evaluation templates for all risks of that risk type and include those assessment criteria in the risk evaluation template.

The RAS 105 may also request additional assessment criteria from an administrator user through the organizational risk application 258. The administrator user may then define additional risk assessment criteria for inclusion in the risk evaluation template.

Figure 4:
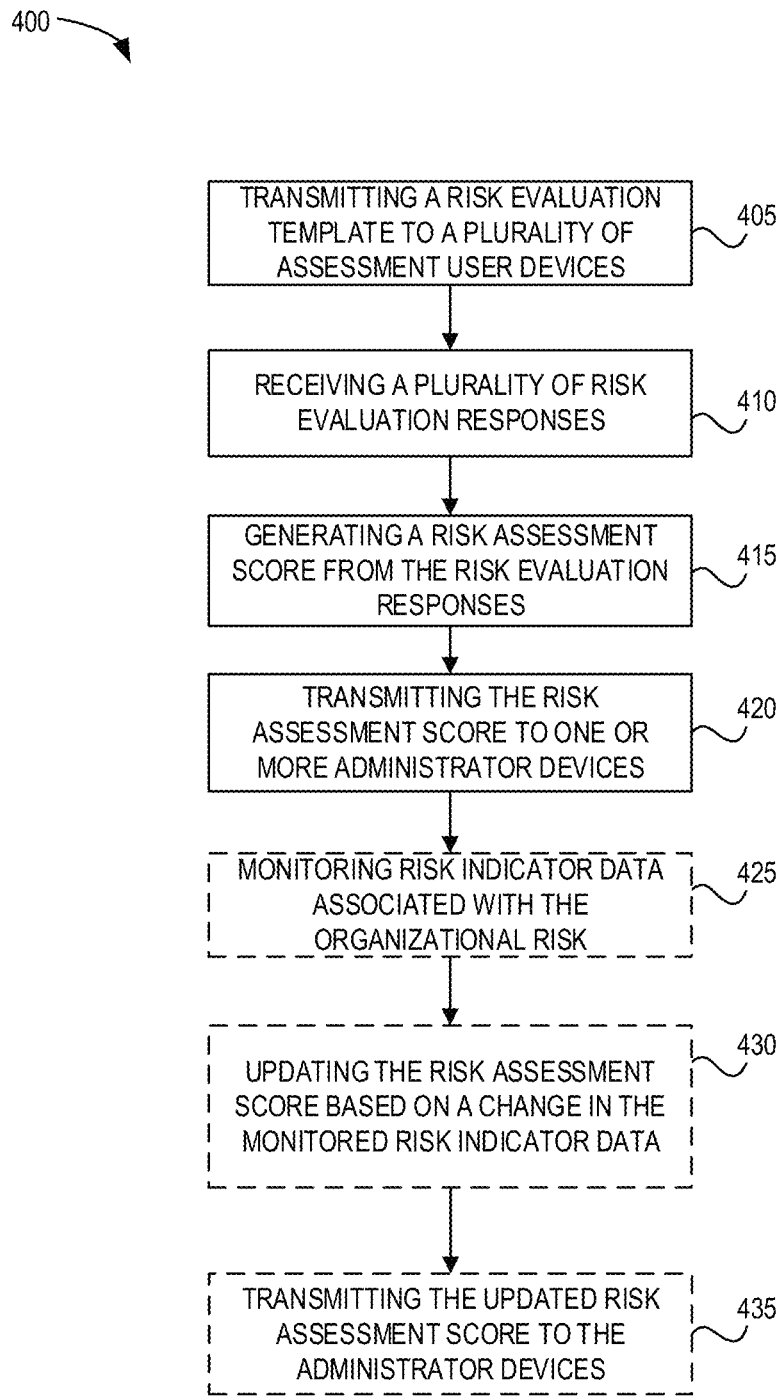
FIG. 4 is a flowchart illustrating a method of analyzing risk data for an organizational network in accordance with an example embodiment.

Referring now to FIG. 4, shown therein is a flowchart illustrating a method or process 400 of analyzing risk data for an organizational network. Method 400 may be carried out by various components of system 200, such as the RAS 105 and the computing device 215.

At 405, the RAS 105 can transmit a risk evaluation template for an organizational risk to a plurality of assessment user devices. The risk evaluation template may be defined at step 330 of method 300. As mentioned, examples of risk assessment criteria can include a technology downtime criterion, a business downtime criterion, a revenue impact criterion, a net income impact criterion, and a reputational impact criterion.

The RAS 105 can transmit the risk evaluation template to computing devices 215 associated with assessment users (i.e. assessment user devices) for the organizational network. The RAS 105 may identify the assessment users based on user profile data stored in the database 238. For example, the user profiles stored in the database 238 may include one or more assessment risk types associated with that user profile. The RAS 105 may identify the assessment users as those users whose assessment risk types correspond to the risk type of the organizational risk being assessed.

For instance, the organizational risk type may be a technology risk type (e.g. corresponding to a cybersecurity related risk). User profiles associated with users whose operations within the organization relate to information technology can include a technology risk assessment type. Accordingly, the RAS 105 can transmit the risk evaluation templates for technology type organizational risks to users having access to appropriate data and operations to assess that risk.

The risk assessment users identified by the RAS 105 may vary based on the size and type of the organizational network 115. In general, the risk assessment users may be identified as users responsible for key operational functions within the organizational network such as the heads of sales, operations, finance and human resources. In some cases, these risk assessment users may be identified by a user of administrator computer 130.

At 410, the risk assessment server 105 can receive a plurality of risk evaluation responses from the assessment user devices. The risk evaluation responses can include user-specific values for the plurality of risk assessment criteria defined in the risk evaluation template. For instance, each assessment user may provide a user-specific value for each risk assessment criteria in the risk evaluation template.

At 415, the risk assessment server 105 can generate a risk assessment score based on the risk evaluation responses. The RAS 105 may also use other risk assessment data, such as automatically monitored risk assessment data (e.g. key risk indicator data) and risk assessment data from other organizational networks when generating the risk assessment score.

The risk assessment score generally defines an expected organizational impact of an organizational risk. In general, the RAS 105 can automatically generate the risk assessment score for an organizational risk based on the user-specific values in the plurality of risk evaluation responses as well as other risk assessment data, such as benchmark data and key risk indicator data. An example sub-process 500 for generating the risk assessment score is described in further detail below with reference to FIG. 5.

The RAS 105 may also use risk outcome data from other organizational networks (e.g. similar networks) when generating the risk assessment score. For example, the RAS 105 may monitor risk outcome data from a plurality of additional organizational networks. The risk outcome data can define the outcome of previously identified organizational risks associated with that additional organizational network. The RAS 105 can store the risk outcome data in the database 238, along with the user-specific values for those additional organizational networks.

When generating the risk assessment score for a particular organizational risk, the RAS 105 may identify corresponding organizational risks from other organizational networks in the database 238. The RAS 105 may then compare the user-specific values received for the current organizational network and the other organizational networks to identify organizational networks with similar user-specific assessment values. The RAS 105 may then determine the risk assessment score by evaluating the risk outcomes from organizational networks with those similar values.

The RAS 105 may allocate the determined risk assessment scores into one of a plurality of risk levels. For example, the RAS 105 may allocate risk assessment scores into low, medium and high risk levels. In other cases, the RAS 105 may define numerical risk assessment scores, e.g. on a range between 0 and 100 or some other numerical range. The RAS 105 may also define the risk assessment scores using a gradient scoring system, e.g. on a color gradient or using various colors such as red, yellow and green to represent different risk levels.

At 420, the risk assessment server 105 can transmit the risk assessment score generated at 415 to one or more administrator devices associated with the organizational network. The risk assessment score may then be displayed to the administrator user through the organizational risk application to allow the user to assess current risk levels, and determine potential preventative actions to undertake.

Figure 7:
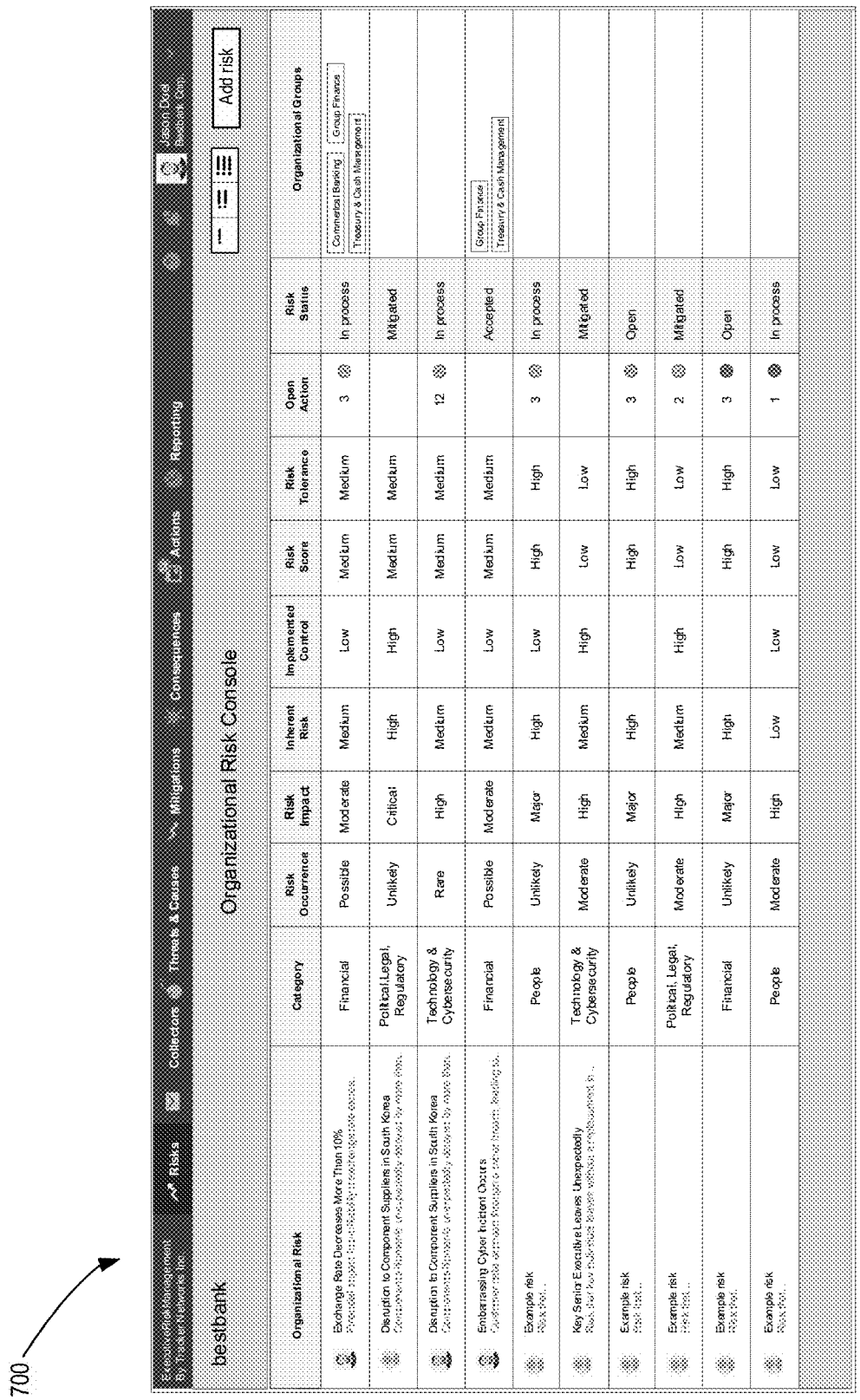
FIG. 7 illustrates an example network risk assessment display in accordance with an example embodiment.
Figure 8:
FIG. 8 illustrates an example detailed risk display in accordance with an example embodiment.
Figure 9:
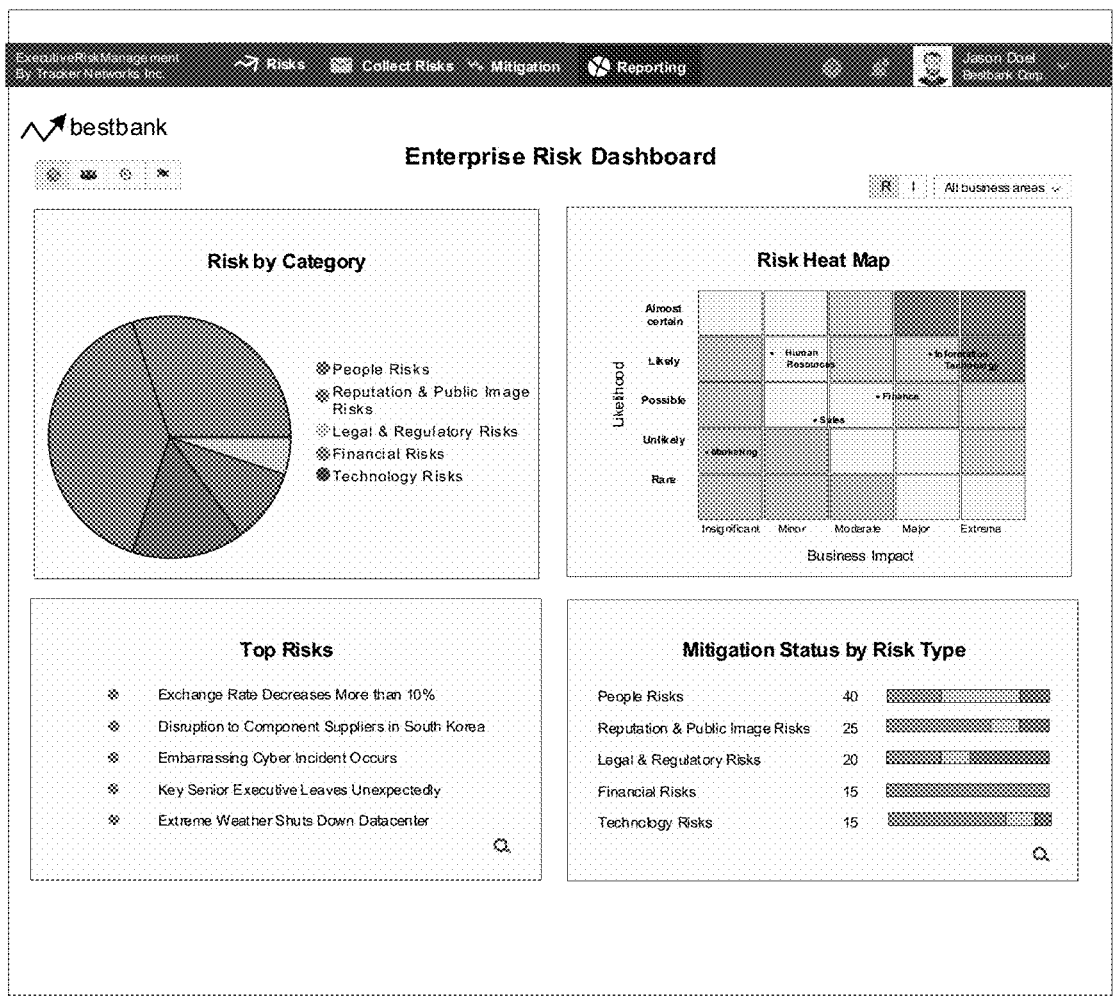
FIG. 9 illustrates an example network risk overview display in accordance with an example embodiment.

Examples of user interfaces displaying risk assessment scores and related risk data are shown in FIGS. 7-9 described herein below.

The RAS 105 may also store a risk tolerance for each of the organizational risks associated with the organizational network in database 238. The risk tolerance may be identified by an administrator user through the organizational risk application 238. The RAS 105 may compare each of the risk assessment scores determined at 415 to the corresponding risk tolerance stored for that organizational network.

The RAS 105 may identify one or more organizational risks having a risk assessment score that exceeds (i.e. is riskier than) the stored risk tolerance. The RAS 105 may identify such organizational risks as risky organizational risks. The RAS 105 may then transmit a high risk notification to the administrator device 120 to notify the administrator user of the risky organizational risk. This may prompt the administrator user to initiate one or more preventative actions and/or adjust the risk tolerance for that organizational risk.

The RAS 105 can also store each of the risk assessment scores determined at 415 in the database 238. The RAS 105 may update (e.g. on a periodic basis, in response to changes in risk data, and/or in response to an update request from an administrator user) the risk assessment scores for the organizational risks associated with the organizational network. The RAS 105 may also store each updated risk assessment score in the database 238.

The RAS 105 may generate a risk assessment score timeline for a particular organizational risk based on the stored risk assessment scores. This may allow the RAS 105 to identify trends in the risk assessment score over time. In some cases, the RAS 105 may automatically generate risk increase notifications when the identified trends indicate an increasing level of risk. The risk increase notifications can be sent to an administrator user to allow the user to implement preventative actions even before risk assessment scores exceed risk tolerances.

In some cases, the risk assessment server 105 can identify risk indicators and risk indicator data associated with an organizational risk. The risk assessment server 105 can use the risk indicator data to modify or update the risk assessment score generated at 415.

In general, risk indicators and risk indicator data refers to data that is correlated with the risk scores assigned to particular organizational risks. For instance, risk indicators may include underlying risk factors that influence the likelihood of a risk occurring and/or the organizational impact that may result from that risk occurring (these may be referred to as causal risk indicators or underlying risk indicators). The risk indicators may also include lagging risk indicators that reflect the status of the underlying risk factors.

The RAS 105 can identify, for at least one organizational risk, a plurality of risk indicators associated with that risk. For example, where the organizational risk relates to financial risk associated with a change in a particular exchange rate or rates, the underlying risk factors can include the number of organizational agreements or activities that involve those exchange rates. The lagging risk indicators may include data extracted from financial market data sources indicating that the particular exchange rates have changed. The RAS 105 may monitor risk indicator data to identify changes in risk indicator data and update risk assessment scores on an ongoing basis.

For example, an organizational network 115 may operate applications that face the internet. Accordingly, the RAS 105 may automatically monitor the internet firewall of the organizational network 115 for attempts by third parties to access the application by attempting to penetrate the firewall. The risk assessment server 105 may be set to count the number of third party attempts to penetrate the firewall and trigger an alert when the number of incidents hits various thresholds set by the organization.

The RAS 105 can then identify one or more computing devices associated with the identified risk indicators. The RAS 105 may identify computing devices storing data associated with the identified risk indicators, and store a risk indicator association for those computing devices in database 238. The RAS 105 may then remotely retrieve the risk indicator data from those computing devices 215 through the local risk assessment application 218.

At 425, the risk assessment server 105 can monitor the risk indicator data associated with an organizational risk. The RAS 105 may monitor the risk indicator data on an ongoing basis (e.g. intermittently or periodically).

The RAS 105 may remotely retrieve risk indicator data stored on one or more computing devices using the local risk assessment application. In some cases, the local risk assessment application 238 may transmit the risk indicator data only if there is a change in the risk indicator data. That is, the local risk assessment application 238 on the computing devices may determine that the locally stored risk indicator data has changed, and then transmit this data to the RAS 105 without requiring prompting by RAS 105. The RAS 105 may store this risk indicator data in the database 238. As updated risk indicator data is retrieved, the RAS 105 may identify changes in the risk indicator data by comparing the received risk indicator data with previously stored risk indicator data.

In some cases, the RAS 105 may also identify offline risk indicator data associated with a risk indicator. Offline risk indicator data may refer to risk indicator data that is not stored on a computing device within the organizational network. For example, offline key risk indicators could include monitoring of the number of complaint calls at an inbound call center, or an organization's social media scores. Such key risk indicators may provide a leading indicator of changes in customer sentiment and service levels towards the organizational network 115, which may in turn affect future revenue growth. The RAS 105 can identify users associated with the offline risk indicator data and store that association in database 238. For instance, an administrator user may identify users associated with offline risk indicator data using organizational risk assessment application 258. In some cases, the RAS 105 may also identify users associated with offline risk indicator data based on user roles within the organizational network.

The RAS 105 can transmit a risk indicator data request to the computing device 215 corresponding to each user associated with offline risk indicator data. The RAS 105 can automatically generate risk indicator data requests on an ongoing (e.g. periodic) basis to ensure that the stored risk indicator data is up to date.

The risk indicator data request can identify the associated risk indicator and define the requested risk indicator data. A user can then provide the requested risk indicator data in a risk indicator data response through the local risk assessment application 218.

The RAS 105 can store and monitor the offline risk indicator data in a similar manner as with the automatically collected risk indicator data. The RAS 105 can also detect changes in the offline risk indicator data as compared to previously-retrieved offline risk indicator data.

At 430, the risk assessment server 105 can update the risk assessment score generated at 415 the risk indicator data detected by the monitoring at 425. For example, the RAS 105 may automatically update the risk assessment scores when a change is identified in the retrieved risk indicator data. This may ensure that the risk assessment scores for the various organizational risks accurately reflect current organizational risk levels.

At 435, the risk assessment server 105 can transmit the updated risk assessment score from 430 to the administrator devices associated with the organizational network. The updated risk assessment score can provide an administrator with real-time data reflecting current levels of organizational risks. In some cases, the updated risk assessment score may be transmitted to the administrator user only if the RAS 105 determines that the defined risk level has changed.

Figure 5:
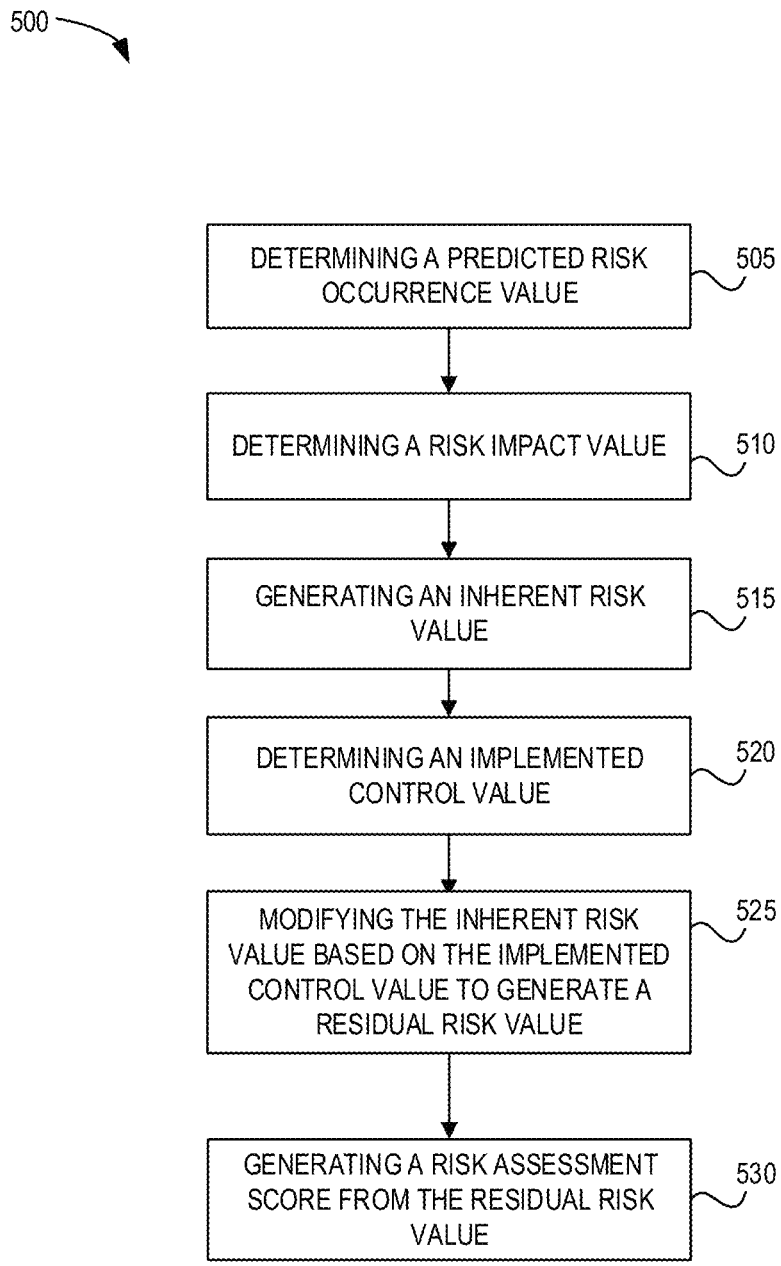
FIG. 5 is a flowchart illustrating a sub-process for generating a risk assessment score for an organizational network in accordance with an example embodiment.

Referring now to FIG. 5, shown therein is a flowchart illustrating a method or process 500 of generating a risk assessment score. Method 500 may be carried out by various components of system 200, such as the RAS 105 and the computing device 215.

At 505, the risk assessment server 105 can determine a predicted risk occurrence value for the organizational risk. The predicted risk occurrence value can be determined as an estimated likelihood of that organizational risk occurring. The RAS 105 may assign the predicted risk occurrence value to a risk occurrence level (e.g. low, medium, high or other similar arrangement of categories) or assign a numerical value for the predicted risk occurrence value.

The RAS 105 may determine the predicted risk occurrence value based on the user-specific responses received in the risk evaluation responses received at 410. Each risk assessment user may provide estimated risk occurrence responses based on risk likelihood criteria in a risk assessment template. The risk likelihood criteria may be defined by a user of administrator computer 130.

In some cases, the RAS 105 may compare the user-specific responses to responses received for similar organizational networks. The RAS 105 may identify similar organizations having similar risk evaluation responses at some point in time. The RAS 105 may then analyze the risk outcome data associated with those similar organizations to determine the predicted risk occurrence value. The RAS 105 may then identify the predicted risk occurrence value based on benchmark risk occurrence data generated from the risk outcomes of similar organizational networks.

Figure 11:
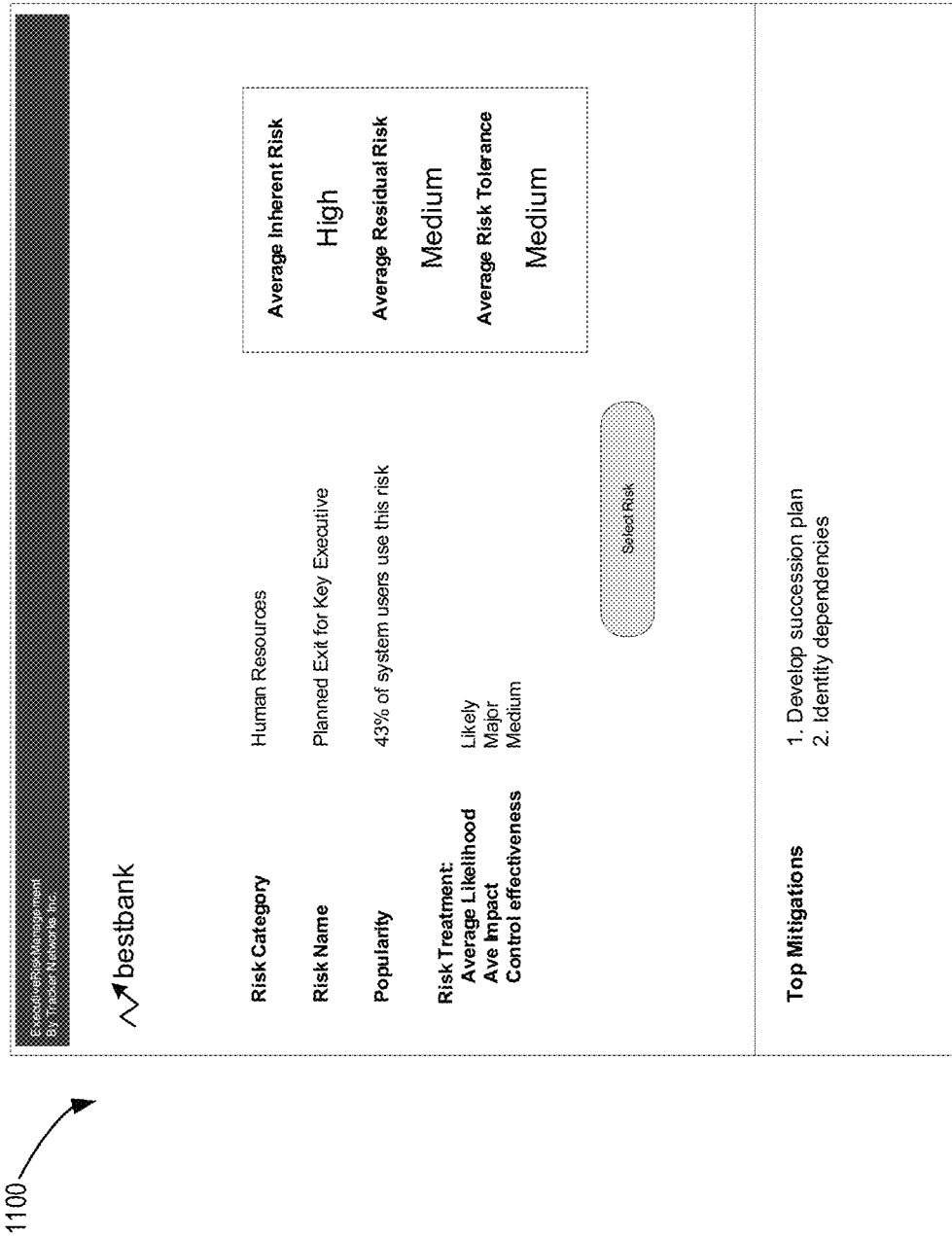
FIG. 11 illustrates an example comparative network risk display in accordance with an example embodiment.

The RAS 105 may also identify preventative actions put in place by those similar organizations (at the point in time at which those organizations had similar risk evaluation responses or afterwards). The RAS 105 may adjust the predicted risk occurrence value for the current organizational network based upon the presence or absence of such preventative actions. The RAS 105 may also define a combined mitigation effectiveness based on the identified preventative actions. The RAS 105 may associate each preventative action with an effectiveness score based on the risk outcome data from similar organizational networks. The effectiveness scores for the identified preventative actions may then be combined (e.g. added or multiplied) to generate the combined mitigation effectiveness. The RAS 105 may adjust the predicted risk occurrence value based on this combined mitigation effectiveness score. In some cases, the RAS 105 may also identify suggested preventative actions (mitigations) that may reduce the predicted risk occurrence value and/or risk impact as shown in FIG. 11 described herein below.

At 510, the risk assessment server 105 can determine a risk impact value for the organizational risk. The predicted risk impact value can be determined as an estimated organizational impact of that organizational risk occurring (i.e. what the impact would be if the risk came to pass). The RAS 105 may assign the risk impact value to a risk occurrence level (e.g. low, medium, high or other similar arrangement of categories) or assign a numerical value for the predicted risk occurrence value.

For example, a business interruption organizational risk may be identified. This organizational risk may be defined as a business interruption that prevents the organizational network from generating revenue for a period of time, e.g. a hurricane shutting down a sales and distribution center. The RAS 105 may define the risk impact value of this risk occurring based on an estimate of the revenue and profitability lost from the shutdown, costs of recovery, and the estimated reputational damage.

As with the predicted risk occurrence value determined at 505, the RAS 105 may determine the risk impact value based on the user-specific responses received in the risk evaluation responses received at 410. The RAS 105 may compare the user-specific responses to responses received for similar organizational networks. The RAS 105 may then analyze the risk outcome data associated with those similar organizations to determine the risk impact value for the organizational risk.

At 515, the risk assessment server 105 can generate an inherent risk value from the predicted risk occurrence value determined at 505 and the risk impact value determined at 510.

For example, the inherent risk value may be determined simply as an addition or multiplication of the predicted risk occurrence value determined at 505 and the risk impact value determined at 510.

In other cases, the RAS 105 may store a mapping in the database 238 between pairs of predicted risk occurrence values and risk impact values and inherent risk values. The RAS 105 may then determine the inherent risk value based on this mapping.

At 520, the risk assessment server 105 can determine an implemented control value for the organizational risk. The implemented control value may indicate a level of organizational control implemented within the organizational network to prevent the occurrence of that risk.

The risk assessment criteria included in the risk evaluation template sent to assessment users may include one or more risk control criteria. For example, the risk evaluation template may identify a plurality of potential risk controls (e.g. based on preventative actions from similar organizational networks). The risk evaluation template may include a simple check box or drop-down menu to allow an assessment user to identify if those preventative actions have been implemented. As mentioned, the risk assessment criteria may also include various objective and subjective risk mitigation assessment criteria. The RAS 105 may determine the implemented control value based on the responses related to the risk mitigation assessment criteria. The RAS 105 may associate each preventative action with an effectiveness score based on the received responses and/or risk outcome data from similar organizational networks. The effectiveness scores for the identified preventative actions may then be combined (e.g. added or multiplied) to generate the implemented control value as a combined mitigation effectiveness.

At 525, the risk assessment server 105 can modify the inherent risk value from 515 using the implemented control value to generate a residual risk value.

The residual risk value may represent the risk level associated with the organizational risk even after control processes have been implemented. For example, the implemented control value may be subtracted from the inherent risk value or the inherent risk value may be divided by the implemented control value to define the residual risk value.

At 530, the risk assessment server 105 can generate the risk assessment score for the organizational risk from the residual risk value. In some cases, the risk assessment score can be generated simply as the numerical value of the residual risk value. In other cases, the RAS 105 may assign the risk assessment score to a risk level (e.g. low, medium, high, critical) to provide a simple risk assessment score for an administrator user. This may provide the administrator user with an easy to understand risk assessment score that allows them to implement preventative actions appropriately.

As a simplified example, the RAS 105 may define the risk occurrence value (at 505), the risk impact value (at 510), and the implemented control value (at 520) on a scale from 1 to 10. The RAS 105 may then determine an inherent risk value by multiplying the risk occurrence value by the risk impact value. The inherent risk value may then be defined on a scale from 1 to 100. For instance, if the risk occurrence value is determined to be 5 and the risk impact value is determined to be 6, the RAS 105 may determine that the inherent risk value is 30. If the implemented control value is determined to be 2, the RAS 105 may then determine the residual risk value by dividing the inherent risk value of 30 by 2, resulting in a residual risk value of 15/100.

As another example, the RAS 105 may provide a single combined calculation to determine a residual risk value. The RAS 105 may determine that the preventative actions reduce the risk impact value and accordingly, the RAS 105 may reduce the risk impact value by the implemented control value (i.e. 6−2=4 given the values set out above). The residual risk value may then be determined by multiplying the reduced risk impact value of 4 by the risk occurrence value of 5 to obtain a residual risk value of 20/100. The particular calculation may be determined by the RAS 105 based on risk outcomes from similar organizational networks.

As another simplified example, an organizational network 115 may operate one or more applications that face the Internet. The RAS 105 may determine that the organizational network 115 has an organizational risk of a third party obtaining unauthorized access to the application, e.g. using "hacking" techniques or as a result of application security flaws.

The impact of such a risk may relate to the organizational network 115 losing application data and potentially confidential data. Accordingly, the risk impact criteria may include a net income criterion (e.g. evaluating potential losses associated with losing the application data) and a reputational impact criterion (e.g. evaluating the potential reputational impact to the organizational network of the application and confidential data being lost). The risk likelihood criteria may include subjective criteria, such as the prevalence of application data breaches in the appropriate organizational sector, historical frequency, and perceived threats to the organizational network 115.

The organizational network 115 may have implemented a number of risk mitigation processes, such as user authentication processes and data encryption processes. The RAS 105 may evaluate aspects of these risk mitigation processes automatically, e.g. by comparing such risk mitigation processes to authentication and encryption protocols implemented by similar organizational networks. The RAS 105 may also include risk mitigation assessment criteria on the risk evaluation template, in which appropriate assessment users evaluate the level of adherence to the organizational protocols.

The RAS 105 may determine, based on the received risk evaluation responses, that the inherent risk level is high. The RAS 105 may also provide a score associated with the inherent risk, e.g. an expected $10 million dollar impact. The RAS 105 may determine from evaluating the risk mitigation processes implemented, and the corresponding response regarding risk mitigation criteria that the organizational network 115 has implemented relatively strong mitigation processes. Accordingly, the residual risk level may be reduced to a medium level (e.g. associated with an expected $5 million dollar impact) or a low risk level (e.g. associated with an expected $1 million dollar impact).

The RAS 105 can also generate inherent risk values, residual risk values and risk assessment scores for a plurality of organizational networks. The risk values generated for the organizational network can be used to define benchmark risk values (e.g. as a mean value or median value) for certain organizational risks. In some cases, the RAS 105 may also identify benchmark risk tolerance values. This may allow administrator users to determine how the risks for their organizational networks compare to other, similar, organizational networks. This may provide additional insight for those users and allow them to determine whether their current risk assessment score appears appropriate for their type of organizational network.

The RAS 105 may also identify preventative actions associated with positive risk outcome data and lower risk assessment scores. The RAS 105 may display these preventative actions to an administrator user as suggested preventative actions. This may allow an administrator user to quickly and easily implement preventative actions knowing that those preventative actions have been associated with positive risk outcomes.

Figure 6:
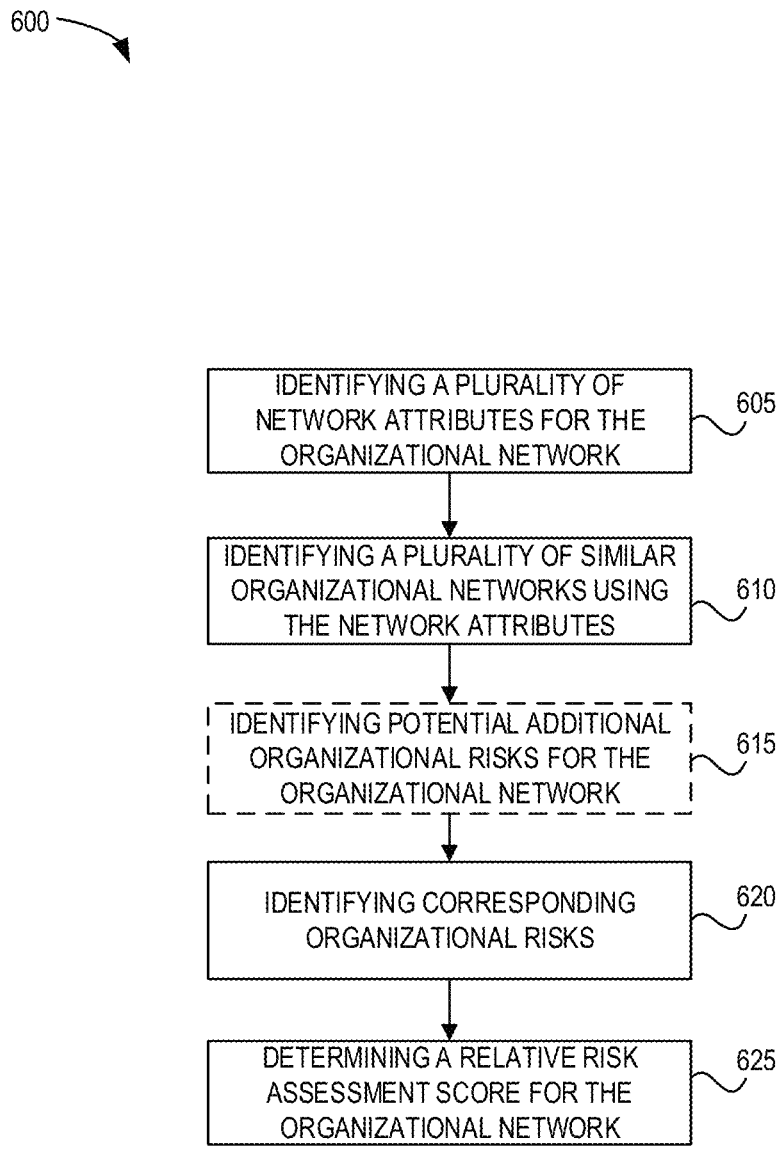
FIG. 6 is a flowchart illustrating a method of analyzing risk data for a plurality of organizational networks in accordance with an example embodiment.

Referring now to FIG. 6, shown therein is a flowchart illustrating a method or process 600 of analyzing risk data for a plurality of organizational networks. Method 600 may be carried out by various components of system 200, such as the RAS 105 and the computing device 215.

At 605, the risk assessment server 105 can determine a plurality of network attributes for the organizational network. The network attributes can include objective attributes such as an organization size, an organization industry or sector, and an organization age. The network attributes may also include an estimated risk maturity determined by the RAS 105. The risk maturity may indicate the extent of previous risk monitoring performed by the organizational network. For instance, the RAS 105 may initially assign the organizational network a low estimated risk maturity by default.

At 610, the risk assessment server 105 can identify a plurality of similar organizational networks using the network attributes from 605. The database 238 can store organizational profiles corresponding to a plurality of organizational networks. Each organizational profile can include the network attributes for that organizational network. The RAS 105 may compare the network attributes for the particular organizational network with the network attributes of other networks stored in the organizational profiles. The RAS 105 may then determine one or more similar organizational networks by identifying networks having similar organizational profiles In some cases, the RAS 105 may assign each organizational network an organization category. For example, an organization may be assigned to a category defined as large-size business-to-business service organizations. The RAS 105 may then identify similar networks based on these organization categories.

In some cases, RAS 105 may define a plurality of organizational groups. The RAS 105 may associate the similar organizational networks into organizational groups, for example based on a shared organizational sector.

Optionally, at 615, the risk assessment server 105 can identify potential additional risks for the organizational network based on risk data for the similar organizational networks. For example, the RAS 105 may identify previously identified organizational risks associated with the similar organizational networks that are stored in the database 238. The RAS 105 can compare these previously identified organizational risks with the risks currently identified for the organizational network in question.

The RAS 105 may identify potential additional organizational risks as the previously identified organizational risks from other networks that were not identified for the network in questions. The RAS 105 may then transmit a notification to the administrator computed 120 identifying the at least one potential additional organizational risk. This may also the administrator user to determine if the potential additional risk is relevant to the organizational network. If the additional risk is relevant, administrator user may then initiate the process of collecting and analyzing relevant risk data using the organizational risk application 258.

At 620, the risk assessment server 105 can identify corresponding organizational risks at the organizational network and similar organizational networks. That is, the RAS 105 can identify which other, similar, organizations have previously identified, assessed and monitored the same organizational risks.

At 625, the risk assessment server 105 can determine a relative risk assessment score for the organizational network. The RAS 105 can compare the risk assessment score for the organizational network with the current risk assessment scores for other, similar organizational networks. The RAS 105 may generate a relative risk score for the organizational network indicating whether the organizational network is at greater or lesser risk than similar organizational networks. For instance, the RAS 105 may determine an average risk assessment score for similar organizational networks. The RAS 105 may then define the relative risk assessment score as compared to that average score.

The RAS 105 can transmit the determined relative risk assessment score to the administrator computer 120. This may allow an administrator to determine the organizational network's risk levels relative to comparable organizations and provide additional context for determining whether to undertake preventative actions.

The RAS 105 may also provide additional comparative risk data to the administrator user. For example, the comparative risk data may also include the most common and/or most effective preventative actions determined from the similar organizations. An example of a user display showing comparative risk data is shown in FIG. 11 described herein below.

Figure 12:
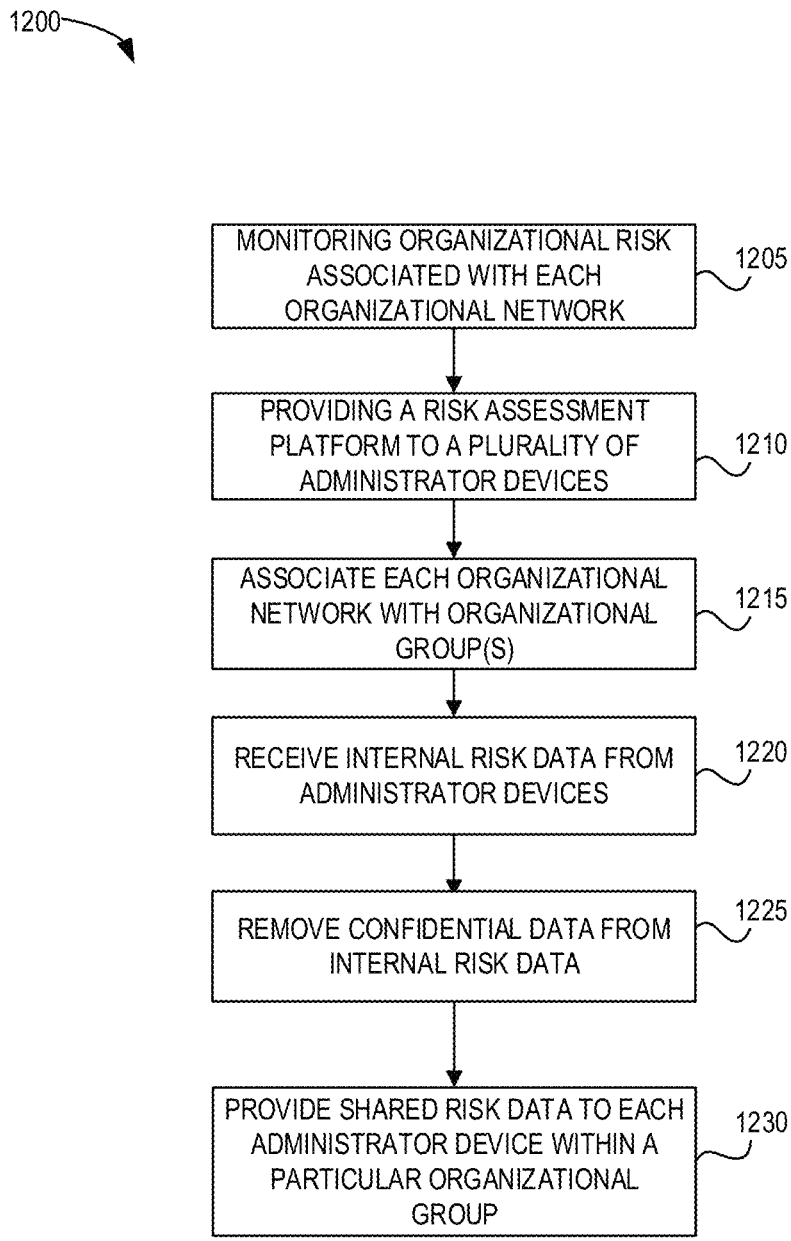
FIG. 12 is a flowchart illustrating another method of analyzing risk data for a plurality of organizational networks in accordance with an example embodiment.

Referring now to FIG. 12, shown therein is a flowchart illustrating a method or process 1200 of analyzing risk data for a plurality of organizational networks. Method 1200 may be carried out by various components of system 200, such as the RAS 105 and the computing device 215.

The example method 1200 is an example of a process of analyzing risk data that may provide a plurality of organizational networks with risk data from other organizational networks. This may allow organizational networks to identify common organizational risks and/or review comparative risk data using internal risk data shared by other organizational networks. The organizational networks may also identify common mitigation actions that can be undertaken by multiple organizational networks. This may allow administrator users associated with multiple organizational networks to collaborate in mitigating risks that are common to those organizational networks.

At 1205, the RAS 105 can monitor organizational risk associated with each organizational network 115. RAS 105 may monitor organizational risk data associated with each organizational network 115 using the systems and methods described herein.

At 1210, the RAS 105 can provide a risk assessment platform to computing devices 215 associated with each organizational network 115. The risk assessment platform may be remotely accessible by computing devices associated with each of the organizational networks 115. The risk assessment platform may be accessible by administrator users associated with each of the organizational networks 115. The administrator users may be users whose role is associated with identifying, monitoring, mitigating etc. organizational risks, risk indicators, mitigation actions and the like within the corresponding organizational network 115.

The risk assessment platform may provide administrator users with a centralized portal usable to monitor and share organizational risk data. The risk assessment platform can be configured to allow administrator users from different organizational networks to collaborate in an efficient and secure manner.

The risk assessment platform may enable administrator users to access organizational groups associated with their organizational network. As described herein above, the organizational groups may be defined automatically by RAS 105 and/or by the administrator users.

The risk assessment platform may provide a group-specific interface for each organizational group. Access to the group-specific interface may be limited to administrator users associated with organizational networks that are associated with the corresponding organizational groups. Administrator users can collaborate within the group-specific interface to, for example, share risk data, identify potential risks to their organizational network, identify common risks, and identify and implement collective mitigation actions.

The risk assessment platform can include risk assessment templates for each of the organizational groups. The risk assessment templates may be used by the administrator users to identify and classify organizational risks. This may help provide some consistency in risk definition across organizational networks.

In some cases, the risk assessment templates may be specific to a given organizational group. For example, for a sector-specific organizational group that corresponds to a specific organizational sector, the RAS 105 can define one or more sector-specific risk assessment templates for that specific organizational sectors. The risk assessment templates can include risk identification templates and/or risk evaluation templates such as those described herein. The risk assessment templates may be used by the administrator users to identify common risks and to identify/develop collective mitigation actions.

In some examples, an administrator user can use the risk templates to define an organizational risk for their organizational network. The organizational risk defined using the shared risk templates may then be used to monitor internal risks within that particular organizational network. RAS 105 may then monitor internal risk data, such as mitigation actions, risk scores etc. for that organizational network in order to generate comparative risk data and/or benchmark data.

At 1215, the RAS 105 can associate each organizational network 115 with one or more organizational groups. In some examples, RAS 105 may automatically associate an organizational network 115 with an organizational group. For example, RAS 105 may automatically associate an organizational network 115 with an organizational group based on the characteristics of the organizational network 115.

In some examples, administrator users may manually associate an organizational network with an organizational group. For example, an administrator user may define a custom organizational group within the risk assessment platform. The administrator user may then moderate the organizational group and the organizational networks associated with that organizational group as described herein. For example, the administrator user may transmit invitations to administrator users associated with additional networks to prompt those networks to be associated with the organizational group. This process may allow administrator users to define organizational group associations in a highly targeted and flexible manner.

In some cases, the risk assessment platform may include an available group interface. The available group interface can include group data associated with organizational groups that an organizational network may be capable of joining. An administrator user may interact with the available group interface to join, or submit a request to join, a particular organizational group. A moderator administrator user for the particular organizational group may then determine whether to accept or reject the request to join.

At 1220, the RAS 105 can receive internal risk data from at least some of the administrator computing devices 215 associated with the organizational networks 115. The internal risk data may be provided by organizational networks electing to share internal risk data with other organizational networks with a particular organizational group or groups. The internal risk data may also include anonymized risk data collected from the plurality of organizational network 115, such as benchmark data and comparative risk data.

Within an organizational group, administrator users associated with organizational networks may elect to have their organizational network share risk data with other organizational networks within the group. The 'sharing' organizational networks may refer to those organizational networks associated with that particular organizational group that have chosen to share risk data. The shared risk data can include internal risk data from each of the organizational networks in the plurality of sharing organizational networks. In some cases, all of the organizational networks associated with the particular group may share internal risk data. The risk assessment platform can also provide an interface allowing administrator users to request that other organizational networks share risk data. RAS 105 can be configured to ensure that the risk data is anonymized and/or that confidential data is removed from the internal risk data prior to being shared with other organizational networks.

At 1225, the RAS 105 can remove confidential data from the internal risk data shared at 1220. As described herein above, prior to sharing the internal risk data with other organizational networks, the RAS 105 can identify and remove confidential data from the internal risk data shared by each of the administrator devices. This may ensure that confidential data is omitted from the data stream provided to the other organizational networks in the organizational group.

In some examples, the RAS 105 can be configured to, for each administrator device sharing internal risk data, automatically remove identified confidential data prior to the internal risk data being included in the shared risk data provided to the organizational group.

Alternately or in addition, RAS 105 may provide an administrator user with a prompt indicating that potential confidential data has been identified. The administrator user may then provide a removal input indicating where the identified data should be scrubbed prior to being shared.

At 1230, the RAS 105 can provide shared risk data to each administrator computing device within a particular organizational group. For example, the RAS 105 may define a data stream of risk data that can be displayed through the risk assessment interface. The data stream can include shared risk data from the plurality of organizational networks in that particular organizational group.

In some examples, the data stream can include shared risk data presented on an individual network basis. That is, shared risk data from each sharing organizational network may be individually displayed in the data stream.

Alternately or in addition, RAS 105 may be configured to generate aggregate risk data from a plurality of sharing organizational networks. For example, aggregate risk data may include total occurrences of certain organizational risks or risk indicators, average values, and/or other aggregate data forms. For example, the aggregate risk data may include a total number of a particular organizational risk identified within the plurality of organizational networks (e.g. identified using a shared risk template); risk scores associated with particular organizational risks (e.g. mean and/or median inherent risk score, residual risk score, control effectiveness score, risk velocity score etc.).

Aggregate shared risk data may also be used to generate group risk indicator data. The group risk indicator data may provide risk indicators that are common or averaged across the organizational networks within a particular organizational group. This may allow the organizational networks to assess risks that are common to the networks within the organizational group, such as sector-specific risks.

RAS 105 can be configured to analyze the shared risk data to identify benchmark risk data. This benchmark risk data may be used to provide feedback to individual administrator users and/or to evaluate risks for individual organizational networks.

RAS 105 may also be configured to analyze the shared risk data to evaluate changes or trends in the shared risk data. For example, RAS 105 may be configured to analyze the shared risk data to identify a change in likelihood and/or impact of an organizational risk. This may provide the organizational networks within an organizational group insight into how common organizational risks are evolving within that organizational group and/or organizational sector. RAS 105 may also be configured to monitor the popularity of organizational risks within the risk assessment platform and to include risk popularity data within the data stream, as described herein above.

In some cases, the RAS 105 may also identify suggested preventative actions (mitigations) that may reduce the predicted risk occurrence value and/or risk impact as shown in FIG. 11 described herein below. For example, RAS 105 may be configured to identify suggested collective preventative actions that may reduce the predicted risk occurrence value and/or risk impact for multiple organizational networks and/or an organizational sector.

For example, RAS 105 may be configured to identify a collective mitigation action for a particular organizational group (e.g. a particular sector-specific group). The collective mitigation action can be determined to correspond to a risk identified for the particular organizational group, such as a sector-specific risk for the specific organizational sector associated with a particular sector-specific group. RAS 105 may generate a collective risk mitigation notification corresponding to the collective mitigation actions. RAS 105 can provide the collective risk mitigation notification to each administrator device associated with each organizational network associated with that particular organizational group, e.g. through the risk assessment platform. The collective risk mitigation notification can provide an indication of the associated sector-specific risk and the residual risk value associated with the collective mitigation action.

In some examples, the collective risk mitigation notification may be generated automatically by RAS 105. Alternately or in addition, administrator users may generate collective risk mitigation notifications for a particular organizational risk. The administrator device can transmit the user-generated collective risk mitigation notification to the other administrator users associated with a particular organizational group.

Optionally, RAS 105 may automatically transmit the user-generated collective risk mitigation notification to other administrator users whose organizational network has identified the same organizational risk. In some cases, this can include administrator users whose organizational network is not within the particular organizational group. Administrator users may interact with the collective risk mitigation notification to indicate that their organizational network can implement the collective risk mitigation action.

In some examples, RAS 105 can be configured to identify a plurality of mitigating organizational networks from the plurality of organizational networks associated with a particular organizational group. The plurality of mitigating organizational networks can be defined as the organizational networks associated with the particular organizational group that are implementing the collective risk mitigation action. RAS 105 may be configured to notify the administrator devices associated with each organizational network associated with that particular organizational group of the plurality of mitigating organizational networks. This may allow the administrator users to operate collectively to mitigate the identified organizational risks.

Referring now to FIG. 7, shown therein is an example organizational risk overview display GUI 700. GUI 700 may be displayed to an administrator user through organizational risk assessment application 258.

GUI 700 provides an administrator user with an overview of risks identified for the organizational network as well as related risk data. As shown in FIG. 7, GUI 700 also provides the administrator user with an overview of predicted risk occurrence values, risk impact values, inherent risk values, implemented control values and organizational risk tolerances. The GUI 700 also identifies the risk categories associated with the various organizational risks, as well as whether any preventative actions are in progress or have been addressed.

GUI 700 provides a summary for a plurality of the organizational risks identified for the organizational network. As GUI 700 illustrates, the organizational risks may be broken down into categories of risk scores, such as high risk, medium risk, and low risk. The organizational risk assessment application also provides the administrator with the ability to drill down to view organizational risks and related risk data. A user may select one of the organizational risks listed in GUI 700 to access a detailed display of application risk information.

Referring now to FIG. 8, shown therein is an example of a detailed risk display GUI 800 in accordance with an embodiment. The detailed risk display GUI 800 may display detailed risk data associated with a particular organizational risk to an administrator user. GUI 800 is an example GUI that may be displayed to an administrator user after selecting an organizational risk listed in GUI 700.

The GUI 800 also displays risk indicator data (e.g. causal risk factors) associated with the organizational risk as well as preventative actions that have been implemented for that organizational risk. An administrator user may select one of the preventative actions to review details of its implementation and status. The GUI 800 may also identify users whose organizational functions are associated with that risk and thus may be suitable to evaluate that risk.

As shown in FIG. 8, GUI 800 may also enable an administrator user to adjust various organizational risk settings, such as the risk tolerance. In some cases, the administrator user may also be enabled to define or re-define the associated risk category and or organizational areas for the organizational risk. The administrator user may also adjust the permissions level required to review and assess the organizational risk through GUI 800.

Referring now to FIG. 9 shown therein is an example of a network risk overview display 900 that may be displayed in accordance with an example embodiment. The network risk overview display 900 may form part of an organization risk portal that may be provided by the organizational risk assessment application 258.

The GUI 900 may provide administrator and corporate users with an overview of the risk levels and risk allocation of organizational risks within that network. The network risk overview GUI may include various, high-level, risk overview displays such as risk registers, risk heat maps, outstanding action reports, risk trending reports that may be useful for reporting to internal users such as executive management and or the Board of Directors.

Figure 10A:
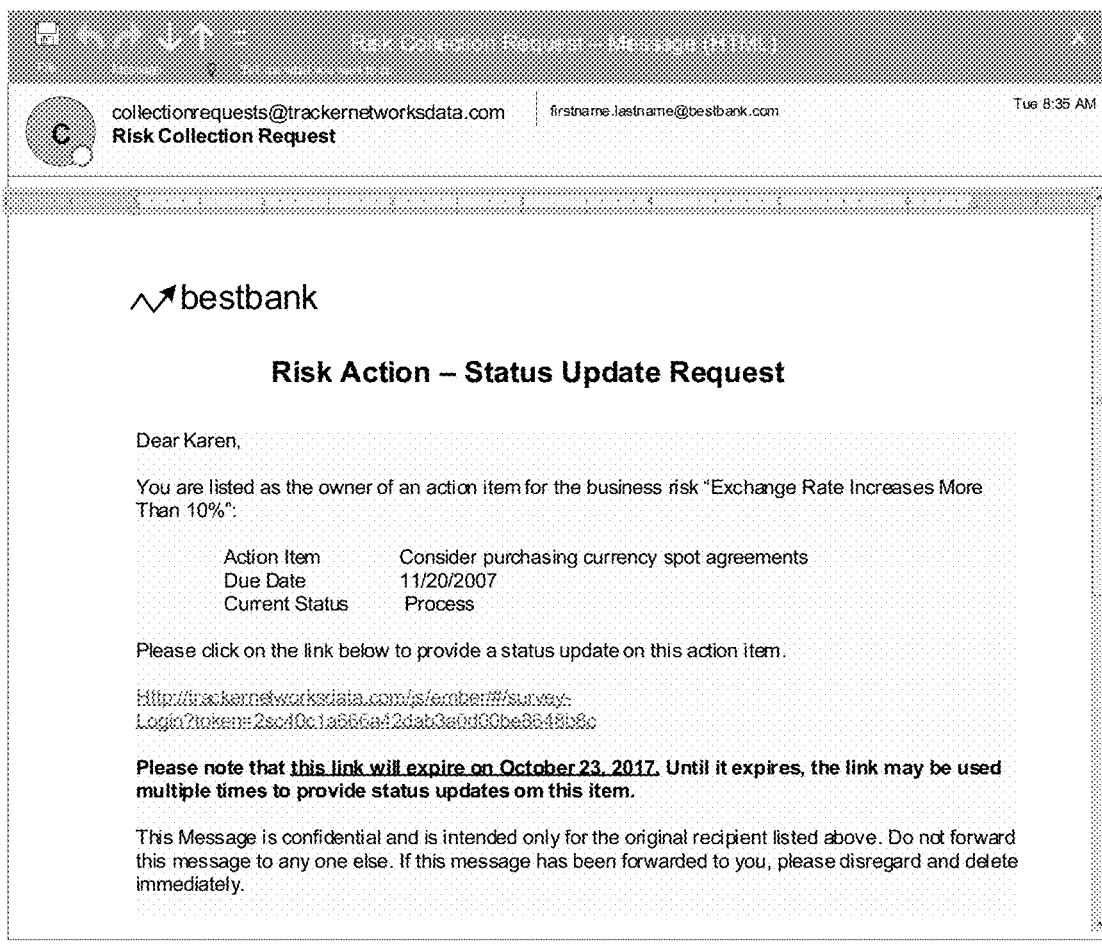
FIG. 10A illustrates an example risk data collection request message in accordance with an example embodiment.

Referring now to FIG. 10A, shown therein is an example risk data request GUI 1000. The risk data request GUI 1000 is an example of a GUI that may be displayed to a user through local risk assessment application 218. The RAS 105 may transmit a risk data request to users to identify organizational risks and associated risk data. The risk data request GUI 1000 may then provide those users with a link to a risk data response template. As shown in FIG. 10, the GUI 1000 may also be used to request updated risk data or risk indicator data associated with an organizational risk.

Referring now to FIG. 10B, shown there is an example of a risk data response GUI 1050. The risk data response GUI 1050 is an example of a partially complete risk data response generated in response to the risk data request. A user can select, or adjust, various attribute fields, such as adjusting the preventative action status from "In Process" to "Completed". The user may also input additional, free-form risk data into the note box shown in GUI 1050.

Referring now to FIG. 11, shown therein is an example of a comparative risk score GUI 1100. The GUI 1100 provides an administrator user with benchmark data associated with a particular organizational risk. As shown in FIG. 11, the benchmark data may be determined based on the average values from similar organizational networks stored in database 238. This benchmark data may provide an administrator user with context to determine whether their current organizational risk levels appear to be appropriate.

The GUI 1100 can also include some suggested or "top" preventative actions/mitigation processes. These suggested preventative actions can be determined based on preventative actions implemented by similar organizational networks with positive risk outcomes. This may provide an administrator user with insight into methods of managing the organizational risk and potentially reducing the associated risk level.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A system for analyzing risk data for a plurality of organizational networks associated with a plurality of different organizations, wherein each different organization is associated with a particular organizational network in the plurality of organizational networks, the system comprising:
   at least one risk assessment processor in communication with the plurality of organizational networks, wherein the at least one risk assessment processor is configured to monitor organizational risk associated with each organizational network, and the at least one risk assessment processor is external to each and every organizational network in the plurality of organizational networks;
   at least one non-volatile storage memory configured to store risk data associated with a plurality of organizational risks, network data associated with each organizational network in the plurality of organizational networks, and organizational group data defining a plurality of organizational groups, wherein each organizational group is associated with at least one of the organizational networks in the plurality of organizational networks;
   wherein
   the at least one risk assessment processor is configured to provide a risk assessment platform that is remotely accessible by a plurality of administrator devices, the plurality of administrator devices including at least one administrator device associated with each of the organizational networks;
   the risk assessment platform defines an organizational group interface accessible by each of the administrator devices, wherein the organizational group interface:
   enables each administrator device to associate one or more organizational groups with the organizational network associated with that administrator device; and
   for a particular organizational group, the particular organizational group being associated with a plurality of group-associated organizational networks from the plurality of organizational networks, provides each administrator device associated with each group-associated organizational network associated with that particular organizational group with access to shared risk data from a plurality of sharing group-associated organizational networks associated with the particular organizational group, wherein the shared risk data includes internal risk data from each of the group-associated organizational networks in the plurality of sharing group-associated organizational networks, wherein the internal risk data is anonymized prior to being included in the shared risk data, and the plurality of sharing group-associated organizational networks includes a plurality of unrelated organizational networks corresponding to different organizations.

2. The system of claim 1, wherein the at least one risk assessment processor is configured to:
   define the plurality of organizational groups to include a plurality of sector-specific groups, wherein each sector-specific group corresponds to a specific organizational sector;
   define sector-specific risk assessment templates for each of the specific organizational sectors;
   define the organizational group interface to:
   enable each administrator device to associate one or more sector-specific organizational groups with the organizational network associated with that administrator device, wherein the one or more sector-specific organizational groups correspond to the specific organizational sector of the organizational network associated with that administrator device; and
   for each sector-specific organizational group, provide each administrator device associated with each organizational network associated with that sector-specific organizational group with the sector-specific risk templates associated with the specific organizational sector that corresponds to that sector-specific organizational group.

3. The system of claim 2, wherein the organizational group interface defines, for each sector-specific organizational group, a data stream of sector-specific risk data for the specific organizational sector that corresponds to that sector-specific organizational group, wherein the data stream of sector-specific risk data comprises a real-time or near-real-time stream of risk data related to risks common to organizational networks within that specific organizational sector, and wherein the data stream of sector-specific risk data is accessible within the organizational group interface to each administrator device associated with each organizational network associated with that sector-specific organizational group.

4. The system of claim 3, wherein, for each sector-specific organizational group, the organizational group interface provides a risk sharing interface that enables each administrator device associated with that sector-specific organizational group to link internal sector-specific risk data to the data stream of sector-specific risk data whereby the data stream of sector-specific risk data includes the linked internal sector-specific risk data.

5. The system of claim 4, wherein the at least one risk assessment processor is configured to remove confidential data from the internal sector-specific risk data linked to the data stream of sector-specific risk data prior to the internal sector-specific risk data being included in the data stream such that the confidential data is not included in the data stream.

6. The system of claim 5, wherein the at least one risk assessment processor is configured to:
identify the confidential data from the internal sector-specific risk data linked to the data stream of sector-specific risk data; and
automatically remove the identified confidential data prior to the internal sector-specific risk data being included in the data stream of sector-specific risk data.

7. The system of claim 5, wherein the at least one risk assessment processor is configured to:
identify potential confidential data from the internal sector-specific risk data linked to the data stream of sector-specific risk data;
generate a data removal prompt for the administrator device prior to including the internal sector-specific risk data in the data stream of sector-specific risk data;
receive a removal input from the administrator device in response to the data removal prompt, wherein the removal input identifies selected confidential data from the identified potential confidential data; and
remove the selected confidential data prior to the internal sector-specific risk data being included in the data stream of sector-specific risk data.

8. The system of claim 3, wherein for each sector-specific group
the at least one risk assessment processor is configured to identify popular risk data for the specific organizational sector corresponding to that sector-specific group, wherein the popular risk data is identified based on risk data interactions from the organizational networks corresponding to the specific organizational sector; and
the data steam of sector-specific risk data includes the identified popular risk data corresponding to the specific organizational sector.

9. The system of claim 2, wherein, for a particular sector-specific group, the at least one risk assessment processor is configured to:
identify a collective mitigation action, wherein the collective mitigation action corresponds to an associated sector-specific risk for the specific organizational sector associated with that particular sector-specific group, and the collective mitigation action defines a mitigation action collectively performable by multiple organization network associated with that particular sector-specific group that is expected to at least partially mitigate the associated sector-specific risk when performed by multiple organizational networks associated with that particular sector-specific group;
generate a collective risk mitigation notification corresponding to the collective mitigation action; and
provide the collective risk mitigation notification to each administrator device associated with each organizational network associated with that particular sector-specific group, wherein the collective risk mitigation notification provides an indication of the associated sector-specific risk, the mitigation action, and the residual risk value associated with the collective mitigation action.

10. The system of claim 9, wherein the at least one risk assessment processor is configured to:
identify a plurality of mitigating organizational networks from the plurality of organizational networks associated with the particular sector-specific group, wherein the plurality of mitigating organizational networks are the organizational networks associated with the particular sector-specific group implementing the collective risk mitigation action; and
notify the administrator devices associated with each organizational network associated with that particular sector-specific group of the plurality of mitigating organizational networks.

11. The system of claim 1, wherein:
the organizational group interface enables each administrator device to share internal risk data with the one or more organizational groups associated with the organizational network associated with that administrator device; and
the at least one risk assessment processor is configured to remove confidential data from the internal risk data shared by each of the administrator devices.

12. The system of claim 11, wherein the at least one risk assessment processor is configured to, for each administrator device sharing internal risk data:
identify potential confidential data from the internal risk data shared by that administrator device;
generate a data removal prompt for that administrator device prior to including the internal risk data in the shared risk data accessible to other administrator devices;
receive a removal input from that administrator device in response to the data removal prompt, wherein the removal input identifies selected confidential data from the identified potential confidential data; and
remove the selected confidential data prior to the internal risk data being shared with other administrator devices.

13. The system of claim 1, wherein:
the network data comprises a plurality of organizational profiles corresponding to the plurality of organizational networks; and
the at least one risk assessment processor is configured to:
identify a plurality of similar organizational networks, wherein each similar organizational network has a similar organizational profile; and
automatically assign the plurality of similar organizational networks to one of the organizational groups.

14. The system of claim 1, wherein the organizational group interface:
enable each administrator device to transmit an organizational group invitation to an additional computing devices associated with an additional organizational network, wherein the organizational group invitation corresponds to a selected organizational group in the plurality of organizational groups, and the organizational group invitation enables the additional computing device to access the organizational group interface for the selected organizational group.

15. The system of claim 1, wherein for each organizational network of at least one of the organizational networks, the at least one risk assessment processor is configured to monitor the organizational risk associated with that organizational network by transmitting a risk data request to each of the user devices in the plurality of user devices associated with that organizational network;

receiving a plurality of risk data responses from the user devices associated with that organizational network, each risk data response identifying a particular organizational risk and defining a plurality of risk attributes associated with the particular organizational risk;

for at least one of the particular organizational risks, defining a risk assessment score by
- generating a risk evaluation template for that particular organizational risk, the risk evaluation template defining a plurality of risk assessment criteria based on the plurality of risk attributes associated with that particular organizational risk;
- transmitting the risk evaluation template to a plurality of assessment user devices in the plurality of user devices associated with that organizational network;
- receiving a plurality of risk evaluation responses from the plurality of assessment user devices, each risk evaluation response including user-specific values for the plurality of risk assessment criteria in the risk evaluation template;
- automatically generating a risk assessment score for the particular organizational risk based on the user-specific values in the plurality of risk evaluation responses, the risk assessment score defining an expected organizational impact of that particular organizational risk; and
- transmitting the risk assessment score for the particular organizational risk to at least one of the user devices associated with that organizational network.

16. A method for analyzing risk data for a plurality of organizational networks associated with a plurality of different organizations, wherein each different organization is associated with a particular organizational network in the plurality of organizational networks, using at least one risk assessment processor in communication with the plurality of organizational networks and at least one non-volatile storage memory, wherein the at least one risk assessment processor is external to each and every organizational network in the plurality of organizational networks, the method comprising:

monitoring, by the at least one risk assessment processor, organizational risk associated with each organizational network;

storing, by the at least one non-volatile storage memory, risk data associated with a plurality of organizational risks, network data associated with each organizational network in the plurality of organizational networks, and organizational group data defining a plurality of organizational groups, wherein each organizational group is associated with at least one of the organizational networks in the plurality of organizational networks;

providing, by the at least one risk assessment processor, a risk assessment platform that is remotely accessible by a plurality of administrator devices, the plurality of administrator devices including at least one administrator device associated with each of the organizational networks;

defining, by the risk assessment platform, an organizational group interface accessible by each of the administrator devices, wherein the organizational group interface:

enables each administrator device to associate one or more organizational groups with the organizational network associated with that administrator device; and for a particular organizational group, the particular organizational group being associated with a plurality of group-associated organizational networks from the plurality of organizational networks, provides each administrator device associated with each group-associated organizational network associated with that particular organizational group with access to shared risk data from a plurality of sharing group-associated organizational networks associated with the particular organizational group, wherein the shared risk data includes internal risk data from each of the group-associated organizational networks in the plurality of sharing group-associated organizational networks, wherein the internal risk data is anonymized prior to being included in the shared risk data, and the plurality of sharing group-associated organizational networks includes a plurality of unrelated organizational networks corresponding to different organizations.

17. A non-transitory computer-readable medium storing computer-executable instructions, wherein the instructions when executed by at least one risk assessment processor configure the at least one risk assessment processor to perform a method for analyzing risk data for a plurality of organizational networks in communication with the at least one risk assessment processor and at least one non-volatile storage memory, wherein the plurality of organizational networks are associated with a plurality of different organizations, wherein each different organization is associated with a particular organizational network in the plurality of organizational networks, and wherein the at least one risk assessment processor is external to each and every organizational network in the plurality of organizational networks, the method comprising:

monitoring, by the at least one risk assessment processor, organizational risk associated with each organizational network;

storing, in the at least one non-volatile storage memory, risk data associated with a plurality of organizational risks, network data associated with each organizational network in the plurality of organizational networks, and organizational group data defining a plurality of organizational groups, wherein each organizational group is associated with at least one of the organizational networks in the plurality of organizational networks;

providing, by the at least one risk assessment processor, a risk assessment platform that is remotely accessible by a plurality of administrator devices, the plurality of administrator devices including at least one administrator device associated with each of the organizational networks;

defining, by the risk assessment platform, an organizational group interface accessible by each of the administrator devices, where the organizational group interface:

enables each administrator device to associate one or more organizational groups with the organizational network associated with that administrator device; and for a particular organizational group, the particular organizational group being associated with a plurality of group-associated organizational networks from the plurality of organizational networks, provides each administrator device associated with each group-associated organizational network associated with that particular organizational group with access to shared risk data from a plurality of sharing group-associated organizational networks associated with the particular organizational group, wherein the shared risk data includes internal risk data from each of the group-associated organizational networks in the plurality of sharing group-associated organizational networks, wherein the internal risk data is anonymized prior to being included in the shared risk data, and the plurality of sharing group-associated organizational networks includes a plurality of unrelated organizational networks corresponding to different organizations.

18. The system of claim 1, wherein for each particular organizational network of at least one of the organizational networks, the at least one risk assessment processor is configured to monitor the organizational risk associated with that particular organizational network by:
   identifying an identified organizational risk in the internal risk data from that particular organizational network;
   determining one or more risk attributes associated with the identified organizational risk;
   comparing the one or more risk attributes with previously-identified risk attributes of a plurality of previously-identified organizational risks, wherein the plurality of previously-identified organizational risks includes at least one externally identified organizational risk that was identified in the internal risk data of a different organizational network, wherein the externally identified organizational risk was not previously identified in the internal risk data of the particular organizational network;
   determining that the identified organizational risk corresponds to a particular externally identified organizational risk in response to determining that the risk attributes and the previously-identified risk attributes have a similarity score above a pre-defined similarity threshold; and
   evaluating the identified organizational risk using a risk evaluation template previously defined for the particular externally identified organizational risk.

19. The system of claim 1 wherein for each particular organizational network of at least one of the organizational networks, the at least one risk assessment processor is configured to monitor the organizational risk associated with that particular organizational network by:
   transmitting a risk data request to each of the user devices in the plurality of user devices associated with that organizational network, wherein the risk data request includes a risk identification template usable by the corresponding user device to identify one or more organizational risks, wherein the risk identification template includes at least one externally identified organizational risk that was identified from the internal risk data of a different organizational network, wherein the externally identified organizational risk was not previously identified in the internal risk data of the particular organizational network;
   receiving a plurality of risk data responses from the user devices associated with that organizational network in response to the risk data request, each risk data response identifying a particular organizational risk and defining a plurality of risk attributes associated with the particular organizational risk, wherein at least one of the risk data responses identifies the particular organizational risk as the externally identified organizational risk; and
   evaluating the identified organizational risk using a risk evaluation template previously defined for the particular externally identified organizational risk.

20. The system of claim 15, wherein:
the particular organizational risk corresponds to an externally identified organizational risk that was identified from the internal risk data of a different organizational network, wherein the externally identified organizational risk was not previously identified in the internal risk data of the particular organizational network; and
the risk evaluation template is predefined based on the shared risk data associated with the externally identified organizational risk.

* * * * *